United States Patent
Francis et al.

(10) Patent No.: US 9,571,352 B2
(45) Date of Patent: Feb. 14, 2017

(54) REAL-TIME AUTOMATED VIRTUAL PRIVATE NETWORK (VPN) ACCESS MANAGEMENT

(71) Applicant: International Business Machines Corporation, Armonk, NY (US)

(72) Inventors: William J. Francis, Plano, TX (US); Daniel McAloon, Plano, TX (US)

(73) Assignee: Softlayer Technologies, Inc., Dallas, TX (US)

( * ) Notice: Subject to any disclaimer, the term of this patent is extended or adjusted under 35 U.S.C. 154(b) by 29 days.

(21) Appl. No.: 14/160,104

(22) Filed: Jan. 21, 2014

(65) Prior Publication Data
US 2014/0136703 A1    May 15, 2014

Related U.S. Application Data

(63) Continuation of application No. 12/722,951, filed on Mar. 12, 2010, now Pat. No. 8,639,801.

(51) Int. Cl.
*G06F 15/173*    (2006.01)
*H04L 12/24*    (2006.01)
*H04L 29/06*    (2006.01)

(52) U.S. Cl.
CPC .......... *H04L 41/50* (2013.01); *H04L 63/0272* (2013.01); *H04L 63/101* (2013.01)

(58) Field of Classification Search
CPC ...... H04L 12/24; H04L 41/50; H04L 63/0272; H04L 63/101
See application file for complete search history.

(56) References Cited

U.S. PATENT DOCUMENTS

| | | | |
|---|---|---|---|
| 7,213,231 B1* | 5/2007 | Bandhole | G06F 8/20 717/101 |
| 7,403,980 B2 | 7/2008 | Stringer-Calvert et al. | |
| 7,486,951 B2* | 2/2009 | Chen | H04L 63/0272 370/351 |
| 7,937,438 B1* | 5/2011 | Miller | H04L 45/02 370/397 |
| 7,987,228 B2 | 7/2011 | McKeown et al. | |
| 8,363,658 B1* | 1/2013 | Delker et al. | 370/395.53 |
| 8,453,192 B2* | 5/2013 | Beyabani | 725/131 |

(Continued)

OTHER PUBLICATIONS

Non- Final Office Action dated Sep. 21, 2012 for U.S. Appl. No. 12/722,951.

(Continued)

*Primary Examiner* — Benjamin M Thieu
(74) *Attorney, Agent, or Firm* — Schmeiser, Olsen & Watts, LLP

(57) ABSTRACT

Provided is a method for managing virtual private network (VPN) access to a network that is partitioned into a plurality of subnetworks (subnets). The method includes providing first information associated with hardware hosted on one or more subnets of the network; providing second information associated with users for VPN access, where the VPN access for each user is determined by a list of hardware each user has permission to access; detecting a hardware triggering event corresponding to a modification of the first information; and responsive to the detection of the hardware triggering event, automatically updating the second information based on the modification of the first information.

12 Claims, 18 Drawing Sheets

(56) References Cited

U.S. PATENT DOCUMENTS

| | | | |
|---|---|---|---|
| 2004/0088542 A1* | 5/2004 | Daude | H04L 12/4641 713/156 |
| 2004/0177276 A1* | 9/2004 | MacKinnon | H04L 63/0263 726/5 |
| 2005/0193103 A1 | 9/2005 | Drabik | |
| 2006/0089121 A1* | 4/2006 | Elgebaly et al. | 455/410 |
| 2007/0288623 A1 | 12/2007 | Kato et al. | |
| 2008/0082640 A1 | 4/2008 | Chang et al. | |
| 2008/0151868 A1* | 6/2008 | Kezys | H04L 12/4641 370/352 |
| 2008/0198858 A1 | 8/2008 | Townsley et al. | |
| 2008/0201486 A1 | 8/2008 | Hsu et al. | |
| 2010/0177674 A1* | 7/2010 | Aggarwal | H04L 45/02 370/312 |
| 2010/0235433 A1 | 9/2010 | Ansari et al. | |
| 2011/0060902 A1* | 3/2011 | Nagata | 713/155 |
| 2011/0206052 A1* | 8/2011 | Tan et al. | 370/395.53 |
| 2011/0225286 A1 | 9/2011 | Francis et al. | |
| 2012/0030751 A1 | 2/2012 | Datta et al. | |

OTHER PUBLICATIONS

Final Office Action dated Feb. 14, 2013 for U.S. Appl. No. 12/722,951.

Non-Final Office Action dated Jul. 16, 2013 for U.S. Appl. No. 12/722,951.

Notice of Allowance dated Nov. 8, 2013 for U.S. Appl. No. 12/722,951.

* cited by examiner

Current : network vpn - management manage account# XXXXX

Account ID    XXXXX    [    ] refresh  ← 654

Total allowed PPTP VPN users    05  ← 656

5/5 PPTP VPN users assigned

| username | ssl access | pptp access | subnets auto \| manual | manual overrides |
|---|---|---|---|---|
| SLXXXXX | ☑ | ☑ | ⦿ ○ | N/A |
| user1 | ☐ | ☐ | ⦿ ○ | N/A |
| user2 | ☑ | ☑ | ⦿ ○ | N/A |
| SLXXXXX-test-level | ☑ | ☐ | ⦿ ○ | N/A |
| user4 | ☑ | ☑ | ⦿ ○ | N/A |
| user5 | ☑ | ☐ | ⦿ ○ | N/A |
| user6 | ☑ | ☐ | ⦿ ○ | N/A |
| user7 | ☑ | ☐ | ⦿ ○ | N/A |
| user8 | ☑ | ☐ | ⦿ ○ | N/A |
| user9 | ☑ | ☑ | ⦿ ○ | N/A |
| user10 | ☑ | ☐ | ⦿ ○ | N/A |
| user11 | ☑ | ☐ | ⦿ ○ | N/A |
| user12 | ☑ | ☑ | ⦿ ○ | N/A |

NOTE: Changes made to SSL or PPTP access for an account are applied immediately.    help?

Fig. 6B

REAL-TIME AUTOMATED VIRTUAL PRIVATE NETWORK (VPN) ACCESS MANAGEMENT

CROSS REFERENCE TO RELATED APPLICATION

This application is also a continuation of application Ser. No. 12/722,951, filed Mar. 12, 2010, now U.S. Pat. No. 8,639,801 issued Jan. 28, 2014.

TECHNICAL FIELD

The present disclosure relates generally to a virtual private network (VPN), and more particularly, to a method and system for real-time automated VPN access management.

BACKGROUND

In recent years, enterprises have utilized virtual private networks (VPNs) on top of public networks such as the Internet, to securely exchange information. A VPN is a private network that takes advantage of the public telecommunications infrastructure, while maintaining security and privacy through the use of a tunneling protocol and security procedures. The VPN may be contrasted with a system of owned or leased lines that can only be used by one enterprise, as its main purpose is to offer the enterprise the same capabilities as that of privately leased lines, but at much lower cost by using the shared public infrastructure.

Current front-end tools for managing access to virtual private network (VPN) focus on users and/or a group of users, and require a dedicated individual (or group of individuals) to manage and administrate. Additionally, the administrator requires some knowledge of the underlying network topology in order to update the users and/or groups whenever the topology changes. The penalty for failing to understand and keep abreast with topology changes on the network infrastructure is manifested as a series of security issues. For example, each time the VPN is modified, such as adding hardware to the network, the administrator takes on the time-consuming and error prone task of keeping a centralized VPN authentication database updated. As such, the administrator typically performs audits to clean up the database.

Although current approaches for managing VPN access has been satisfactory for their intended purpose, they have not been satisfactory in all respects. Therefore, what is needed is a method and apparatus for real-time automated VPN access management.

SUMMARY

The present disclosure provides various embodiments for managing virtual private network (VPN) access from a view of the underlying hardware on a network. One of the broader forms of an embodiment of the present disclosure involves a method of managing virtual private network (VPN) access to a network partitioned into a plurality of subnetworks (subnets). The method includes providing first information associated with hardware hosted on one or more subnets of the network; providing second information associated with users for VPN access, wherein the VPN access for each user is determined by a list of hardware each user has permission to access; detecting a hardware triggering event corresponding to a modification of the first information; and responsive to the detection of the hardware triggering event, automatically updating the second information based on the modification of the first information.

Another one of the broader forms of an embodiment of the present invention involves a method of managing virtual private network (VPN) access to a private network divided into a plurality of subnetworks (subnets). The method includes providing address information or host names associated with a plurality of devices hosted on the plurality of subnets; providing authentication information associated with a plurality of users for VPN access, wherein the VPN access for each user is determined based on the devices each user has permission to access; responsive to a triggering event, evaluating the address information to determine a subnet relevant to the triggering event; and automatically updating the authentication information based on the determination of the relevant subnet.

Yet another one of the broader forms of an embodiment of the present invention involves a system for managing virtual private network (VPN) access to a network partitioned into a plurality of subnetworks (subnets). The system includes a first database having first information associated with hardware hosted on one or more subnets; a second database having second information associates with users for VPN access, where the VPN access for each user is determined by a list of hardware each user has permission to access; and a management module coupled to the first and second databases and operable to: detect a hardware triggering event corresponding to a modification of the first information of the first database; and responsive to the detection of the hardware triggering event, automatically update the second information of the second database based on the modification of the first information.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIGS. 6A and 6B are exemplary screen layouts of an external VPN management page and internal VPN management page, respectively, according to the sequence diagram of FIG. 5;

DETAILED DESCRIPTION

Figure 1:
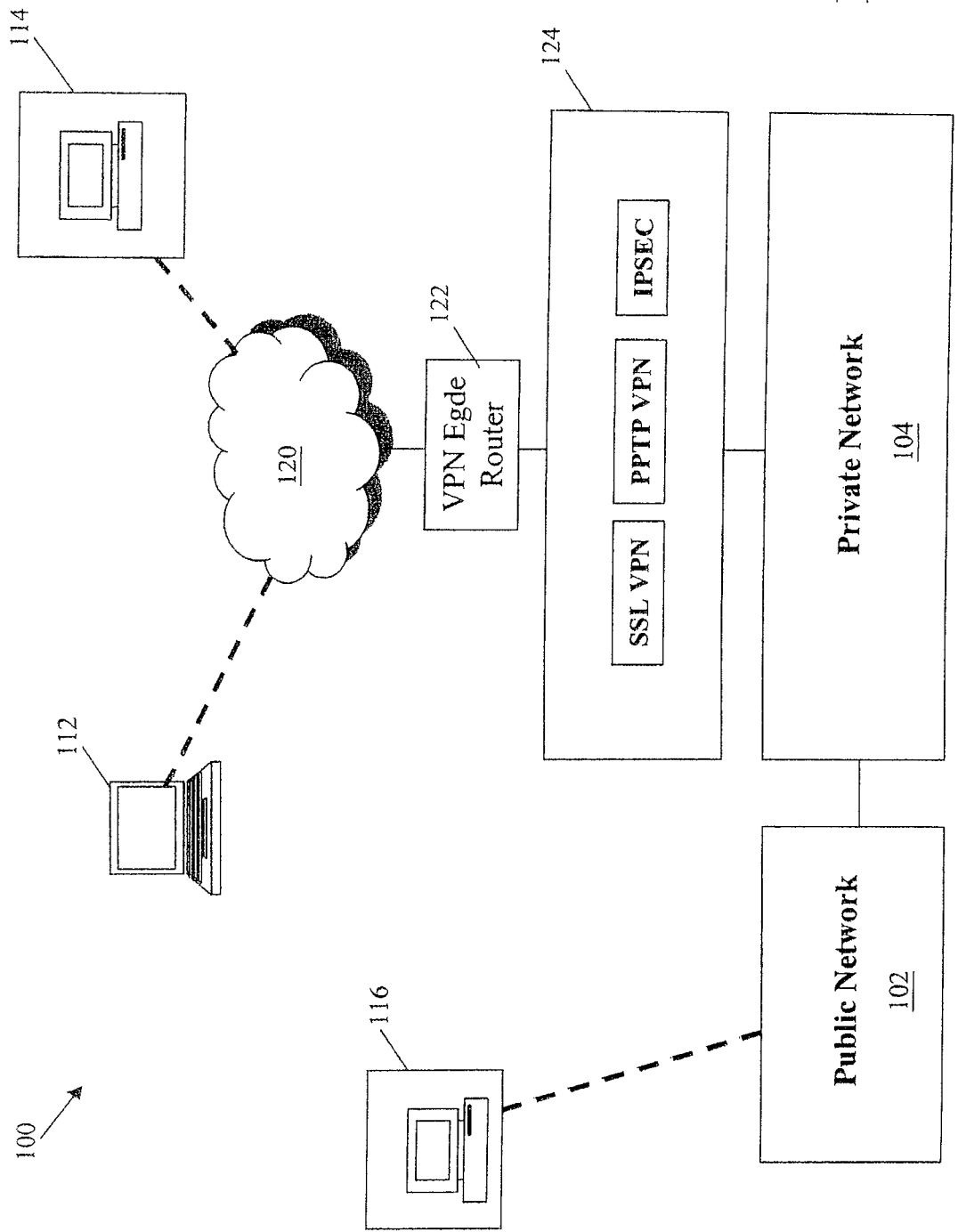
FIG. 1 is a block diagram of an exemplary system in which various embodiments disclosed herein may be practiced.

It is understood that the following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 2:
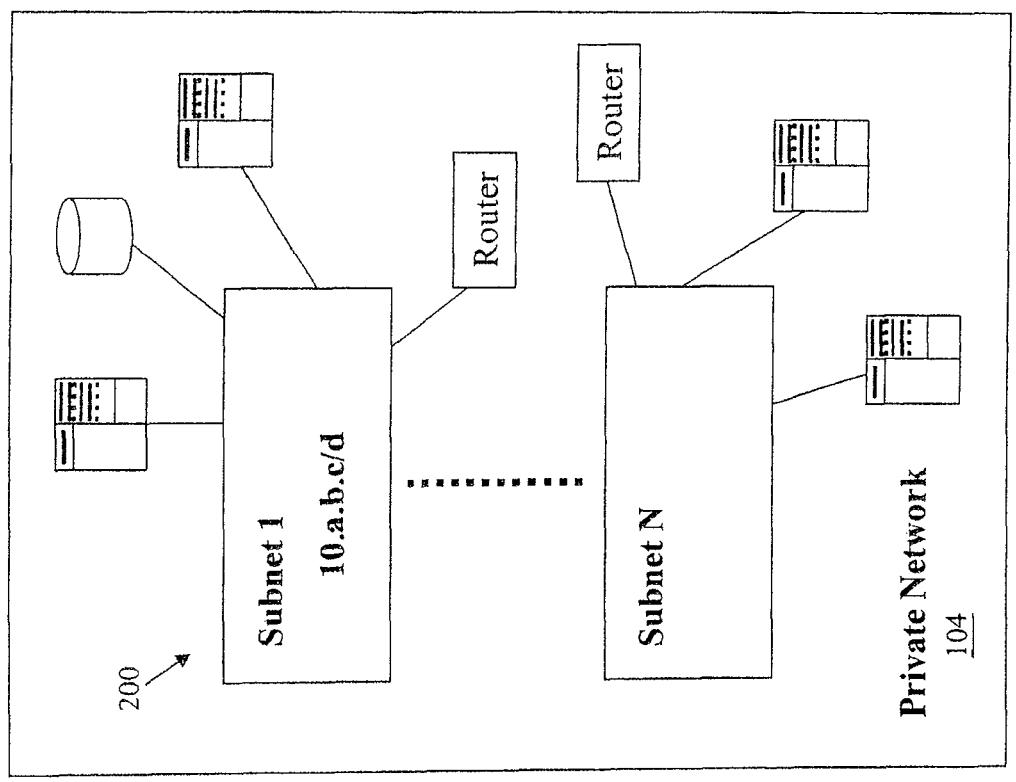
FIG. 2 is a diagrammatic view of a private network that is partitioned into a plurality of subnetworks (subnets)

FIGS. 1 and 2 provide diagrammatic representations of an exemplary system 100 in which various embodiments of the present disclosure may be practiced. In FIG. 1, the system 100 includes a public network 102 and a private network 104 that are provided and managed by a third-party service provider. An enterprise may outsource and rely on the third-party provider to provide IT solutions for its business including networking, web hosting, Internet, security, software applications, servers, memory, processors, distributed systems, data centers, and other suitable services. As such, an important function of the third-party provider is to provide a secure environment for users associated with the enterprise to access these services and exchange sensitive information. Although only one enterprise is discussed in the present embodiment, it is understood that any number of enterprises may utilize the services of the third-party provider. Accordingly, the third-party provider may implement virtual local area networks (VLANs) and virtual private networks (VPNs) for each enterprise to accomplish this important function.

It is understood that other components (not shown) may be deployed in the system 100. For example, the system components may include local area networks (LANs), wide area networks (WANs), gateways, routers, servers, firewalls, public and private access switches, security systems, and other suitable components known in the art for providing a proper operating environment in the system 100.

The enterprise includes a plurality of users 112, 114, 116. For example, the users 112-116 may be employees of the enterprise that utilize the services provided by the third-party provider, and/or customers to which the enterprise resells these services. The users 112-116 may use computers, work stations, laptops, cellular devices, or any suitable communication device to connect (wired or wireless connection) to the public network 102 and the private network 104. The third-party provider may provide a customer portal that can be accessed by the users 112-116. The customer portal includes tools and resources that cover categories such as administrative, support, security, hardware, public network, private network, and sales. One or more of the users may be responsible for server management and VPN access management (e.g., external administrator) for the enterprise. Accordingly, the external administrator can use tools and resources under the administrative category to add/remove users and manually configure VPN access for users as will be discussed in detail below.

The public network 102 provides Internet connectivity to the user 116 and handles public traffic to hosted websites and/or online resources. The public network 102 includes various components (not shown) such as gateways, network security systems, load balancers, firewalls, servers, and other suitable devices. The public network 102 is coupled to the private network 104. Accordingly, the public network 102 is capable of automated IP routing and management, secure private VLAN per customer/enterprise, gigabit speed from server to the Internet, and unlimited inbound bandwidth.

The private network 104 (referred to as the "backend") includes various components such as servers, data centers, processors, routers, other suitable network devices. The private network 104 facilitates complete control over server management for the external administrator of the enterprise. The private network 104 may function to provide server-to-server connectivity where the enterprise has two or more servers within the private network. Accordingly, the enterprise's servers can communicate over a private connection on the same secure VLAN. Additionally, the private network 104 may function to provide server-to-services connectivity. The enterprise's private VLAN and all connected servers have access to resources such as network access server (NAS), file transfer protocol (FTP), domain name system (DNS) resolvers, operating system (OS) update servers, and other devices over the server backend network. Further, the private network 104 may function to provide VPN access to the backend server. The VPN is used to provide access to the private network 104 via private routing mechanisms and to separate traffic of different customers of the third-party provider. As such, the backend server access is kept off limits to external traffic and allows secure transfer of sensitive information.

The users 112, 114 can connect to the private network 104 through a dedicated, non-public carrier 120 that is coupled to a VPN edge router 122. The VPN edge router 122 may route traffic utilizing a VPN gateway 124 such as a secure socket layer (SSL) VPN gateway, a point-to-point tunneling (PPTP) VPN gateway, and internet protocol security (IPSEC) VPN gateway, SSL, PPTP, and IPSEC are known authenticating and encrypting mechanisms, and thus are only briefly discussed herein. For example, the users 112, 114 may launch a web browser and enter a VPN address to reach a VPN portal. The users 112, 114 may then enter a valid username and password in the VPN portal (e.g., VPN authentication process) to create a private SSL tunnel to the private network 104. Once connected, the users 112, 114 are granted access to its private VLAN which allows the user to connect to its server private IP address on the private network 104 via secure shell (SSH), remote desktop protocol (RDP), terminal services, or other server control type applications.

In FIG. 2, the private network 104 may be partitioned into a plurality of subnets 200 (e.g., Subnet 1 . . . Subnet N). The user's private VLAN may be mapped directly to one or more of the subnets 200 within the private network 104. As such, the private VLAN may include various computers and other network-enabled devices that behave as if they were connected to the same local wire although they may be in different geographical locations. The subnet 200 hosts various hardware devices and may be defined by the IP addresses of hardware hosted on that subnet. Accordingly, each subnet may include a server that serves the subnet and may be addressed by a common designated IP address routing prefix. For example, Subnet 1 may host hardware devices that include IP addresses expressed in Classless Inter-Domain Routing (CIDR) notation such as 10.a.b.c/d as will be explained in detail below. The subnets 200 may be arranged logically in a hierarchical structure such that the private network's address space is divided into a tree-like routing structure. Routers may be used to interchange traffic between subnets and may constitute borders between the subnets. It is noted that hardware and/or devices as used herein encompasses physical devices such as servers, storage devices, routers, and processors, and non-physical devices such as computer instances and virtual machines. In most cases, the virtual IP address would be on the same subnet although this is not a requirement.

As noted above, the users 112, 114 may establish a VPN connection to the private network 104, and thus may have access to hardware hosted on one or more subnets 200 in the private network 104. In the various embodiments disclosed below, the external administrator of the enterprise has the ability to allow or deny VPN access by device address or machine name. The external administrator can restrict the number of subnets for the users 112, 114 during the VPN authentication process, by restricting the list of devices or machines a user can access. Additionally, the external administrator can manually configure VPN access by removing or adding subnets to user's "white" list (list of subnets the user has permission to access), in the event the administrator deems it necessary to temporality bypass dynamically configuring VPN access, for example, during a maintenance cycle.

The present disclosure provides various embodiments below for managing virtual private network (VPN) access from a view of the underlying hardware involved rather than a user/group based administration approach. Using this approach, updates to a centralized authentication database are triggered automatically in response to hardware events such as adding/removing hardware on the network. This hardware-first approach significantly decreases human action involved, as well as security lapses that may occur during traditional VPN management. This approach also enforces a tree-like permission system onto the users, distributing administration and abstracting the user from the logical network details (subnets/CIDRs) of the backend.

Figure 3:
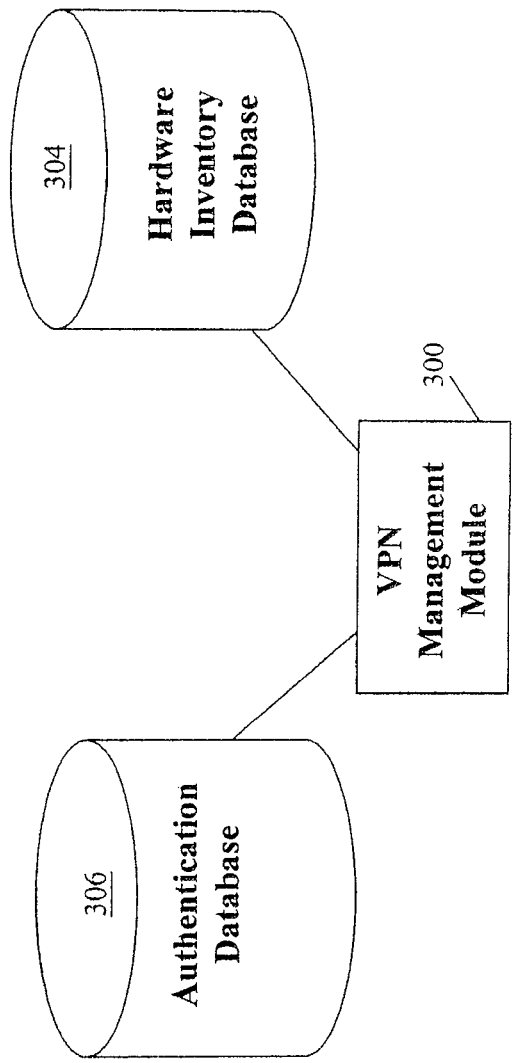
FIG. 3 is a diagrammatic view of a virtual private network (VPN) management module according to an embodiment of the present disclosure.

FIG. 3 is a diagrammatic representation of a VPN management module 300 according to an embodiment of the present disclosure. As discussed above with reference to FIGS. 1 and 2, the external administrator of the enterprise is responsible for managing the enterprise's servers on the private network 104 and managing VPN access to the private network for all users associated with the enterprise. The third-party provider provides a customer portal that includes an administrative section that can be accessed by the external administrator to perform these responsibilities. Accordingly, the external administrator may access a management portal that includes a VPN management module 300 executed therein. Additionally, the VPN management module 300 may be utilized by an employee of the third-party provider (e.g., internal administrator) for managing VPN access for all customers/enterprises of the third-party provider. The VPN management module 300 includes numerous features that enable the external/internal administrator to allow/deny VPN access on a machine by machine basis as will be discussed in detail below.

The VPN management module 300 has access to a hardware inventory database 304 and an authentication database 306. The VPN management module 300 may function to manage permissions (VPN users) based on the underlying hardware on the network. Accordingly, the hardware inventory database 304 includes an inventory of all hardware and/or network-enabled devices on the network. The database 304 includes information corresponding to the location of the hardware on the network (i.e., what route gets to the hardware). There are triggers in place that manage the addition and removal of hardware from the network. For example, an event is broadcasted from a lowest level of hardware in response to a triggering event. As such, the hardware database can be updated in real-time when there is a modification of the underlying hardware on the network, and at that time, the device's location on the network can be determined dynamically using well known network discovery protocols.

The authentication database 306 includes authentication information associated with all users. In the present embodiment, user access to hardware on the third-party's web-based portal (web permission) is translated into VPN access on a hierarchical basis. That is, an algorithm creates a list of users subnet requirements (list of subnets) based on a list of hardware or "machines" the user has access to. Thus, the database 306 contains the machines a user has access to, except in cases where the administrator desires to manually override/specify subnet access as will be explained below. This abstracts the knowledge of the network layer from the administrator. Using this approach, updates to the authentication database 306 are triggered automatically in response to hardware events such as adding/removing hardware on the network.

The authentication database 306 may be implemented as a centralized authentication database, such as Remote Authentication Dial In User Service (RADIUS). It is understood that RADIUS is known in the art, and thus is only briefly described herein. It should be noted that other types of authentication services may be implemented such as Microsoft Internet Authentication Service (IAS) and other third-party authentication mechanisms. In the present embodiment, the RADIUS database is used to manage VPN access. RADIUS is a client/server protocol that runs in the model/application layer using User Datagram Protocol (UDP) as transport. The VPN server is a gateway that controls access to the VPN and includes a RADIUS client component that communicates with the RADIUS server. The RADIUS server may be a background process and may function to authenticate users before granting them VPN access.

The authentication database 306 stores VPN authentication records of users. For example, the authentication database 306 includes a table structure of a user record that comprises objects such as, but not limited to, user identification, username, password, first name, last name, company name, address, city, state, country, postal code, email, office phone number, account identification, parent identification, VPN allowed flag, PPTP VPN allowed flag, IP restrict, VPN manual configuration, and other suitable objects. Additionally, the authentication database 306 includes a table structure of a VPN override that comprises objects such as, but not limited to, user identification, user record identification, and subnet identification. It is understood that the VPN management module 300 may be implemented to operate with other enterprise related systems that keep track of the employees such an entry badge system, or human resource packages, as well as other inventory related systems that keep track of the hardware on a local and/or wide area network.

Figure 4:
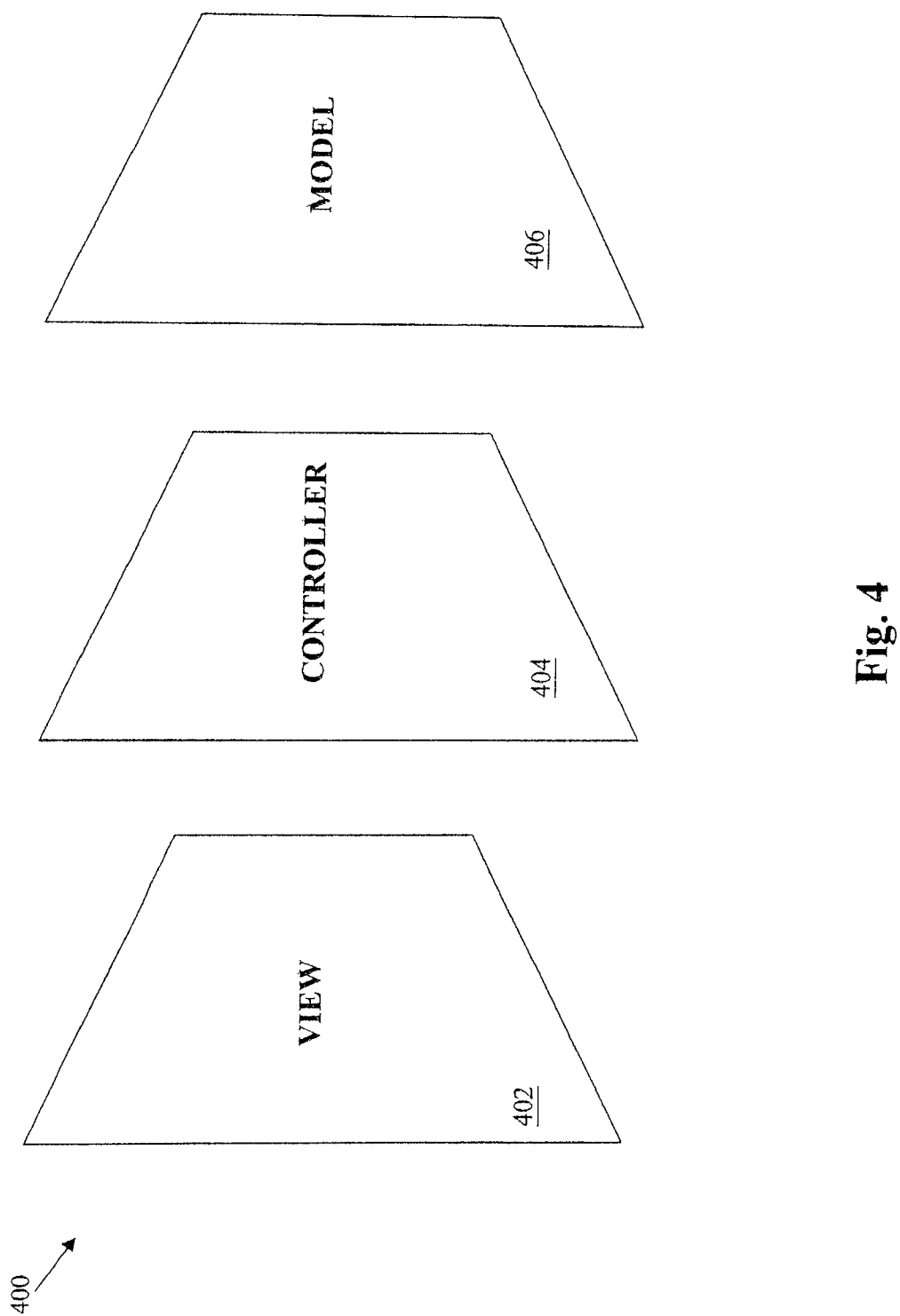
FIG. 4 is a diagram of a model-view-controller architecture for providing content and interfacing with an end-user in a web-based application according to an embodiment of the present disclosure.

Referring to FIG. 4, a model-view-controller (MVC) architecture 400 is an example for providing content and interfacing with a user in a web-based application. It is understood that the MVC architecture is known in the art, and thus only briefly discussed herein. The MVC architecture 400 includes a view layer 402, controller layer 404, and a model layer 406 (also referred to as an application layer). The view layer 402 utilizes a markup language such as (Hypertext Markup Language) HTML for formatting and displaying information to a user. The controller layer 404 receives inputs from the user and initiates requests to the model layer 406. That is, the controller layer 404 translates user requests to model/application requests. The model layer 406 may have access to a database such as the authentication database 306 shown in FIG. 3 in which VPN authentication records of various users are stored therein. The model layer 406 may directly open the database 306 and run queries to the database using SQL, MySQL, or any number of other suitable query languages known in the art. A scripting language such as Hypertext Preprocessor (PHP) may be implemented to run on a web server (PHP web applications) for creating dynamic web portal pages. It is understood that alternate scripting languages such as Practical Extraction Report Language (Perl) and Active Server Page (ASP) may be implemented without departing from the scope and spirit of the present embodiment. The web portal pages may include external pages for displaying content and interfacing with an external administrator (also referred to as a master user) that is a customer of a third-party provider. The external administrator may oversee and manage a number of users and/or devices associated with an account of the customer. Additionally, the web portal pages may include internal pages for displaying content and interfacing with an internal administrator that is an employee of the third-party provider. The internal administrator may oversee and manage all accounts for the third-party provider. As such, some content available to the internal administrator is not available to the external administrator. The various sequence diagrams and screen layouts disclosed below are examples that can be implemented with the MVC architecture 400 of FIG. 4. The sequence diagrams and screen layouts disclosed below enable the external/internal administrator to manage VPN access (VPN users) by allowing/denying VPN access to individual or group of servers.

Figure 5:
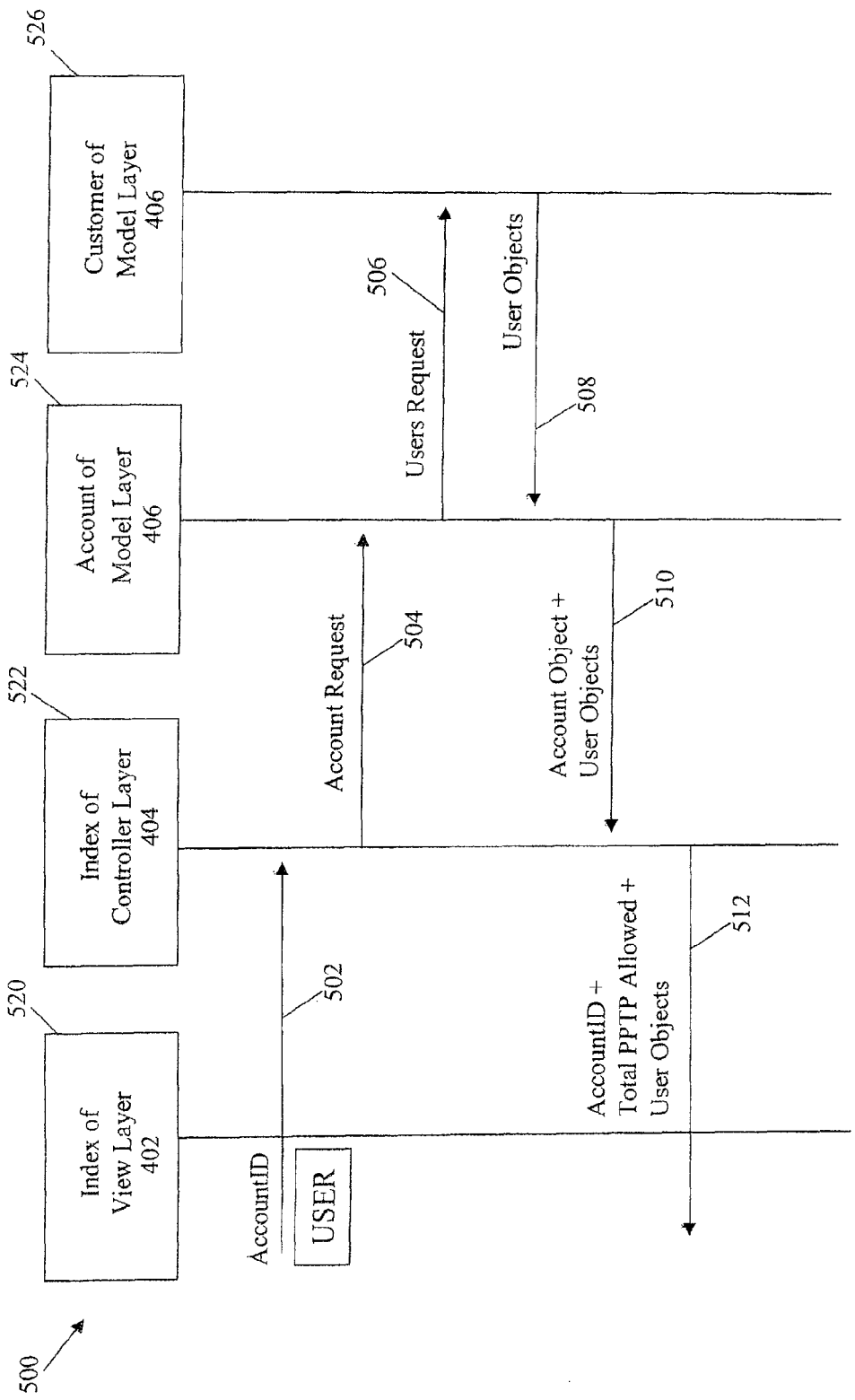
FIG. 5 is a sequence diagram of an exemplary process for populating a VPN management form according to an embodiment of the present disclosure.

FIG. 5 is a sequence diagram 500 showing an exemplary process for populating a VPN management form according to an embodiment of the present disclosure. The sequence diagram 500 utilizes an Account ID parameter. The sequence diagram 500 begins with step 502 in which a user (e.g., external/internal administrator) enters a valid Account ID in an index template 520 of the view layer 402. A socket connection is opened to the controller layer 404 by which the Account ID is sent to an index 522 of the controller layer 404. In step 504, account information is requested in an account class 524 of the model layer 406. In step 506, users of the account are requested in a customer class 536 of the model layer 404. The account users information associated with the Account ID may be stored in a database that stores VPN authentication records (similar to the one 306 disclosed in FIG. 3) or the data may be stored in a separate database or application. In step 508, user objects are retrieved. In step 510, account objects and users objects are provided to the controller layer 404. The account objects may include any number of restrictions, in this case, a total number of PPTP users allowed for the account. In step 512, the Account ID, a total PPTP users allowed, and user objects are provided to the view layer 402 to populate the VPN management form using for example ASCII text that can be viewed by the user.

Figure 6A:
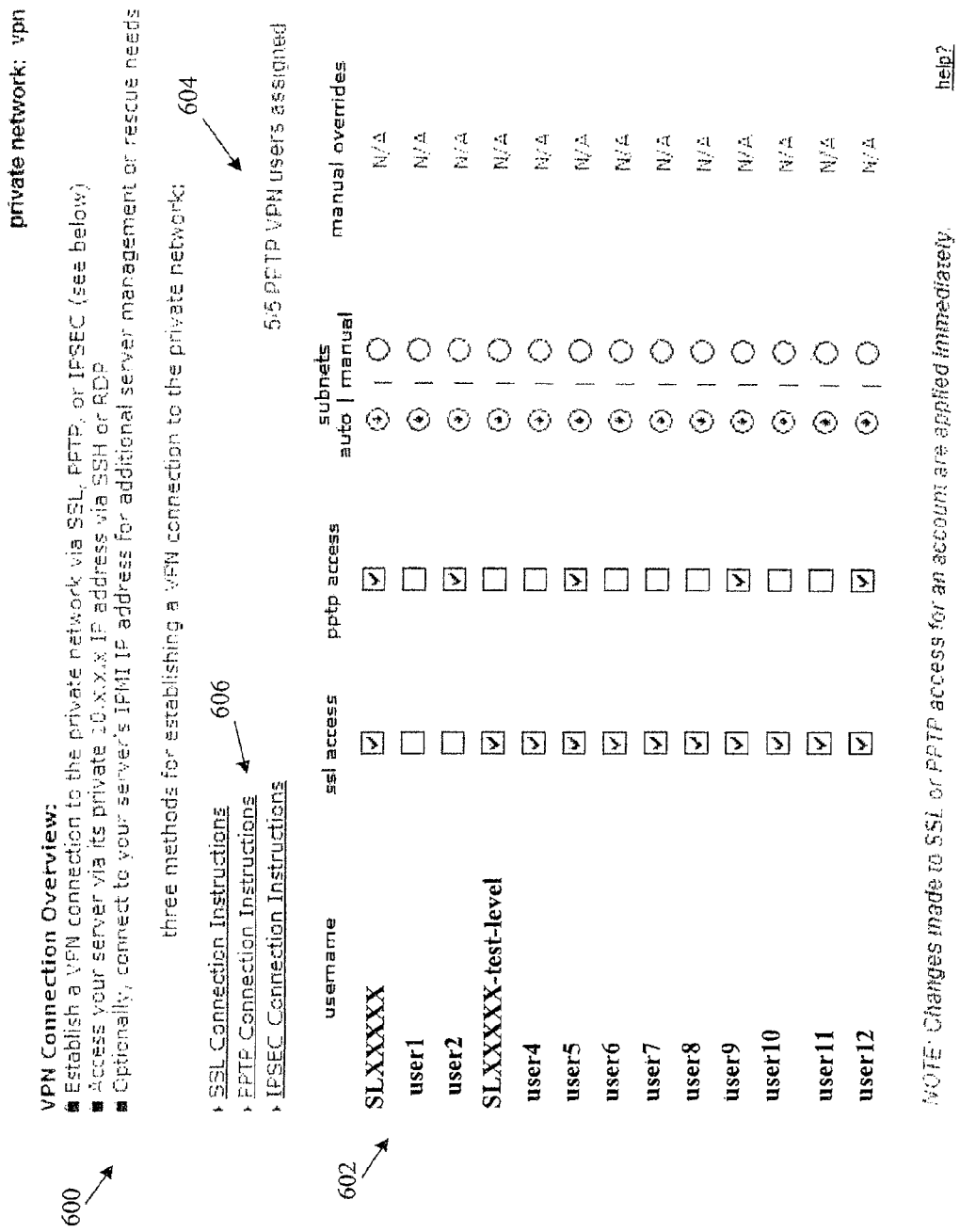

Referring also to FIGS. 6A and 6B, illustrated are exemplary screen layouts of an external VPN management page 600 and internal VPN management page 650 that may be populated according to the sequence diagram 500 of FIG. 5. The external VPN management page 600 is similar to the internal VPN management page 650 except for the differences discussed below. The external VPN management page 600 may be viewed and utilized by an external administrator (or master user) of an account to manage VPN access for users associated with that account. Although one level of administration is illustrated for the sake of clarity, it is understood that managing VPN access may be implemented in more than one level in situations where a customer is a large reseller of services to sub-users, and/or where the sub-user resells services to other sub-users and so on. In those situations, a sub-user can view and manage their sub-users but not other users/sub-users that are at or above the level of that sub-user. This inherently enforces a tree-like permission system onto the users, and since this hardware first approach allows a user to see hardware he/she has access to, he can only assign hardware to his/her sub-users from his/her own subset of the master account holder's hardware pool. Accordingly, sub-users are allowed to manage group permissions of their sub-users and so on. However, the external administrator (or master user) of the account can view and manage all users and sub-users associated with the account. It is understood that the external administrator of an account cannot view and manage users of a difference account. The internal VPN management page 650 may be viewed and utilized by an internal administrator (employee of the third-party provider) to manage VPN access to all users (including all external administrators or master users) of all accounts. However, even in this scenario, the internal administrator could not assign a child user access to hardware that that child's parent object does not own. It is important that the system enforce hardware hierarchy at all times in order to properly establish subnet routing when events are detected on the physical and logical layers of the network.

In FIG. 6A, the external VPN management page 600 includes a list of users 602 for an account and total number of PPTP VPN users allowed/assigned 604 for the account. The external VPN management page 600 provides links 606 to instructions regarding three methods for establishing a VPN connection to the private network such as SSL connection, PPTP connection, and IPSEC connection using various client operating systems, as was discussed above with reference to FIG. 1. The list of users 602 includes information such as username, SSL access, PPTP access, subnets auto/manual, and manual overrides. One of the users of the account may include an external administrator (or master user) that manages VPN access for all users of the account. In the present example, the external administrator is referenced with a username having prefix SL followed by the account number (e.g., SLXXXXX where XXXXX is the account number in this example). The other users may be referenced with usernames without the prefix SL (e.g., user1, user2, user3, . . . user12). The SSL and PPTP columns indicate types of encryption schemes that may be employed for securely accessing the VPN. The subnet auto/manual column indicates whether automatic or manual subnet selection is used. The automatic selection would set access to a default setting (dynamic configuration of VPN access) where the user has access to all valid subnets that host hardware the user has rights to. Accordingly, the user would have VPN access via all those subnets. In the automatic selection mode, it is noted that the external administrator does not select subnets or enter any network related information other than whether or not the user has access, and if so which of the two VPN client protocols (e.g., SSL and PPTP) will be used. However, the manual selection option allows subnet access to be manually set or overridden by the external administrator as will be explained in detail below.

The external administrator can perform various actions from the external VPN management page 600. For example, the external administrator may disable SSL access or PPTP access for a user which will result in revoking user access. The external administrator may enable SSL access or PPTP access for a user which will result in granting user access unless doing so would exceed the PPTP limits of the account. In this case, an error message would be displayed. The external administrator may change subnets from auto to manual selection which will result in a "manual overrides" edit link being displayed (see FIG. 10), thus activating manual overrides for the user, and ignoring the default setting. That is, activating manual overrides will disable dynamic configuration for this user, causing all relevant hardware events that would dynamically adjust subnet routing to get ignored. The external administrator may click on the "manual overrides" edit link which will result in taking the external administrator an underlying network layout page (see FIG. 13) as will be discussed below. The external administrator may change subnets from the manual to the auto setting, which will result in removing the manual overrides edit link, thus deactivating manual overrides for the user, and restoring the default setting.

In FIG. 6B, the internal VPN management page 650 includes a list of users 652 of an account (e.g., account # XXXXX) similar to the list of users 602 discussed above. The internal VPN management page 650 further includes an Account ID field 654 for inputting an account number and a link 656 for modifying a total number of allowed PPTP VPN users. The internal administrator can perform various actions from the internal VPN management page 650. For example, the internal administrator may enter an account ID in the field 654 and click "refresh" which will result in displaying a maximum number of PPTP access allowed for that account, a number of PPTP access available for that account, and a list of users of that account. The internal administrator may disable SSL access or PPTP access for a user which will result in revoking user access. The internal administrator may enable SSL access or PPTP access for a user which will result in granting user access unless doing so would exceed the PPTP limits of the account. In this case, an error message would be displayed. The internal administrator may change subnets from auto to manual selection which will result in a "manual overrides" edit link being displayed (see FIG. 10), thus activating manual overrides for this user, and ignoring the dynamic configuration. The internal administrator may click on the "manual overrides" edit link which will result in taking the internal administrator to an underlying network layout page (see FIG. 13) as will be discussed below. The internal administrator may change subnets from the manual to the auto setting, which will result in removing the manual overrides edit link, thus deactivating manual overrides for this user, and restoring the default setting. The internal administrator may click on the total allowed PPTP VPN users link 656 which will result in taking the internal administrator to a PPTP limits page (see FIG. 12) as will be discussed below.

Figure 7:
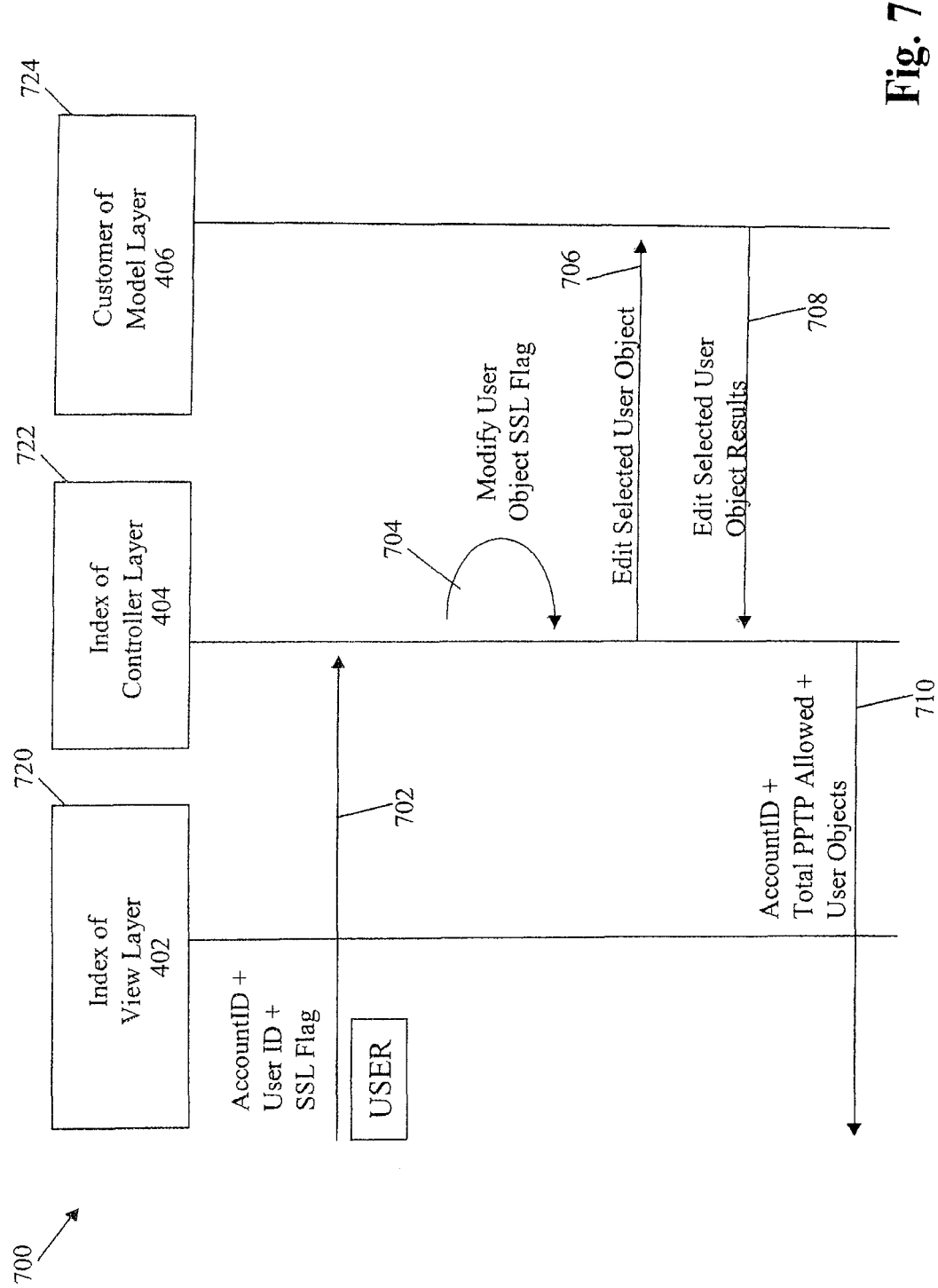
FIG. 7 is a sequence diagram of an exemplary process for changing secure socket layer (SSL) access for a user according to an embodiment of the present disclosure.

FIG. 7 is a sequence diagram 700 showing an exemplary process for changing SSL access for a user according to an embodiment of the present disclosure. As discussed above with reference to FIGS. 6A and 6B, the external/internal administrator can enable/disable SSL access for a user. The process shown in the sequence diagram 700 utilizes an Account ID parameter, User ID parameter, and SSL flag parameter. In step 702, the user (external/internal administrator) clicks on the SSL access box in the VPN management pages 600, 650 (FIG. 6A, 6B) to enable (i.e. box checked) or disable (i.e. box unchecked) SSL access for a user. Accordingly, the Account ID, User ID, and SSL Flag are sent to the index 722 of the controller layer 404. The sequence diagram 700 continues with step 704 in which the user object SSL flag is modified in the controller layer 404. In step 706, as a result, a request is sent to edit the selected user object in the customer class 724 of the model layer 406. In step 708, results of the edited selected user object is sent to the controller layer 404. The sequence diagram 700 continues with step 710 in which the Account ID, a total PPTP allowed, and user objects are provided to the index template 720 of the view layer 402 to populate an updated VPN management page to display the change of SSL access for that user.

Figure 8:
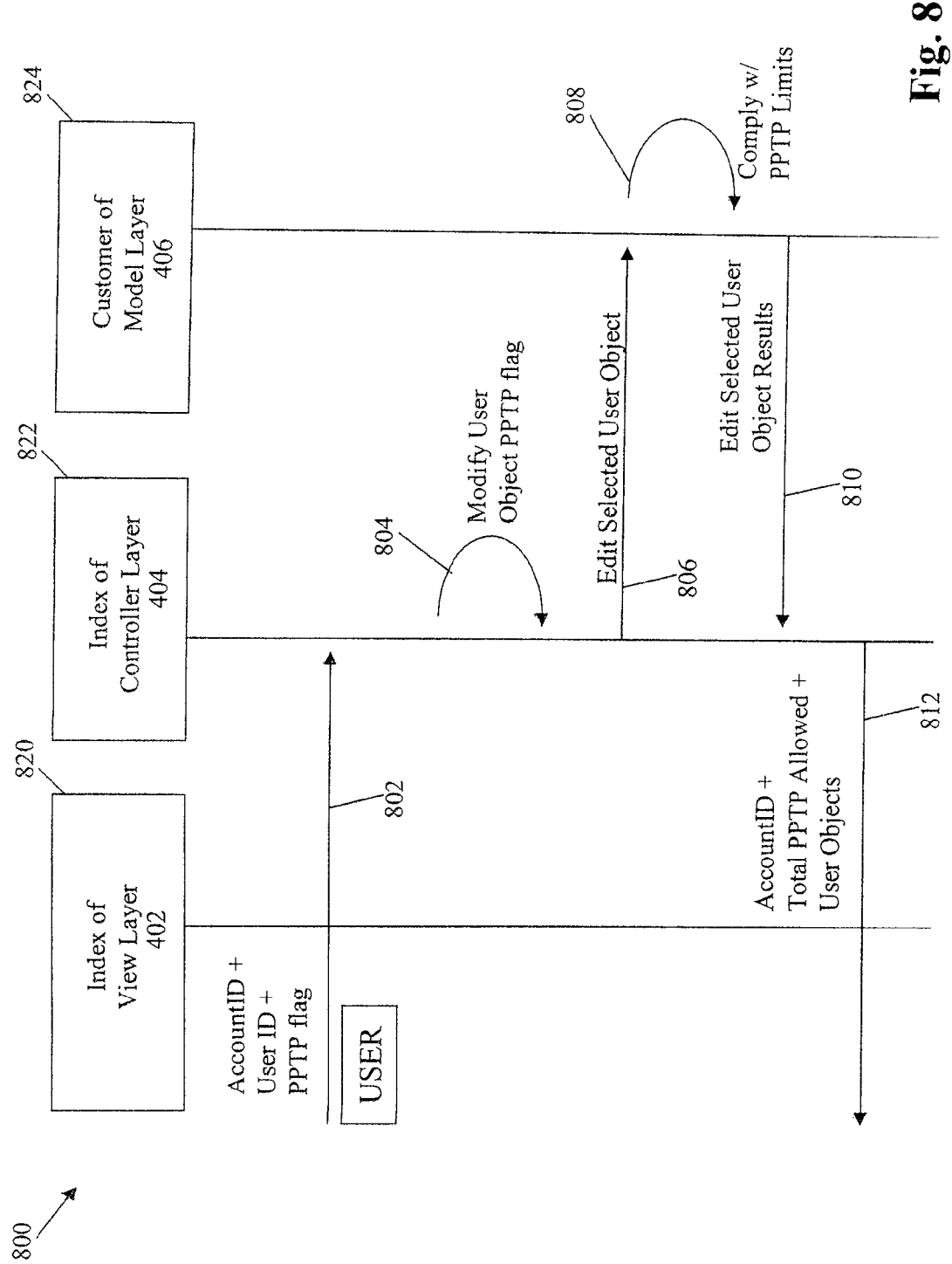
FIG. 8 is a sequence diagram of an exemplary process for changing point-to-point tunneling protocol (PPTP) access for a user according to an embodiment of the present disclosure.

FIG. 8 is a sequence diagram 800 showing an exemplary process for changing PPTP access for a user according to an embodiment of the present disclosure. As discussed above with reference to FIGS. 6A and 6B, the external/internal administrator can enable/disable PPTP access for a user. The process shown in the sequence diagram 800 utilizes an Account ID parameter, User ID parameter, and PPTP flag parameter. The sequence diagram 800 begins with step 802 in which the user (external/internal administrator) clicks on the PPTP access box in the VPN management pages 600, 650 (FIG. 6A, 6B) to enable (i.e. box checked) or disable (i.e. box unchecked) PPTP access for a user. Accordingly, the Account ID, User ID, and PPTP Flag are sent to the index 822 of the controller layer 404. In step 804, the user object PPTP flag is modified in the controller layer 404. In step 806, as a result, a request is sent to edit the selected user object in the customer class 824 of the model layer 406. The sequence diagram 800 continues with step 808 in which a determination is made as to whether the desired change complies with a PPTP limit of that account. If the change does not comply, an error message may be displayed indicating that the requested change will exceed the PPTP limits of the account. The sequence diagram 800 continues with step 810 in which results of the edited selected user object is sent to the controller layer 404. In step 812, the Account ID, an integer representing the total PPTP users allowed, and user objects are provided to the index template 820 of the view layer 402 to populate an updated VPN management page to display the change of PPTP access for that user.

Figure 9:
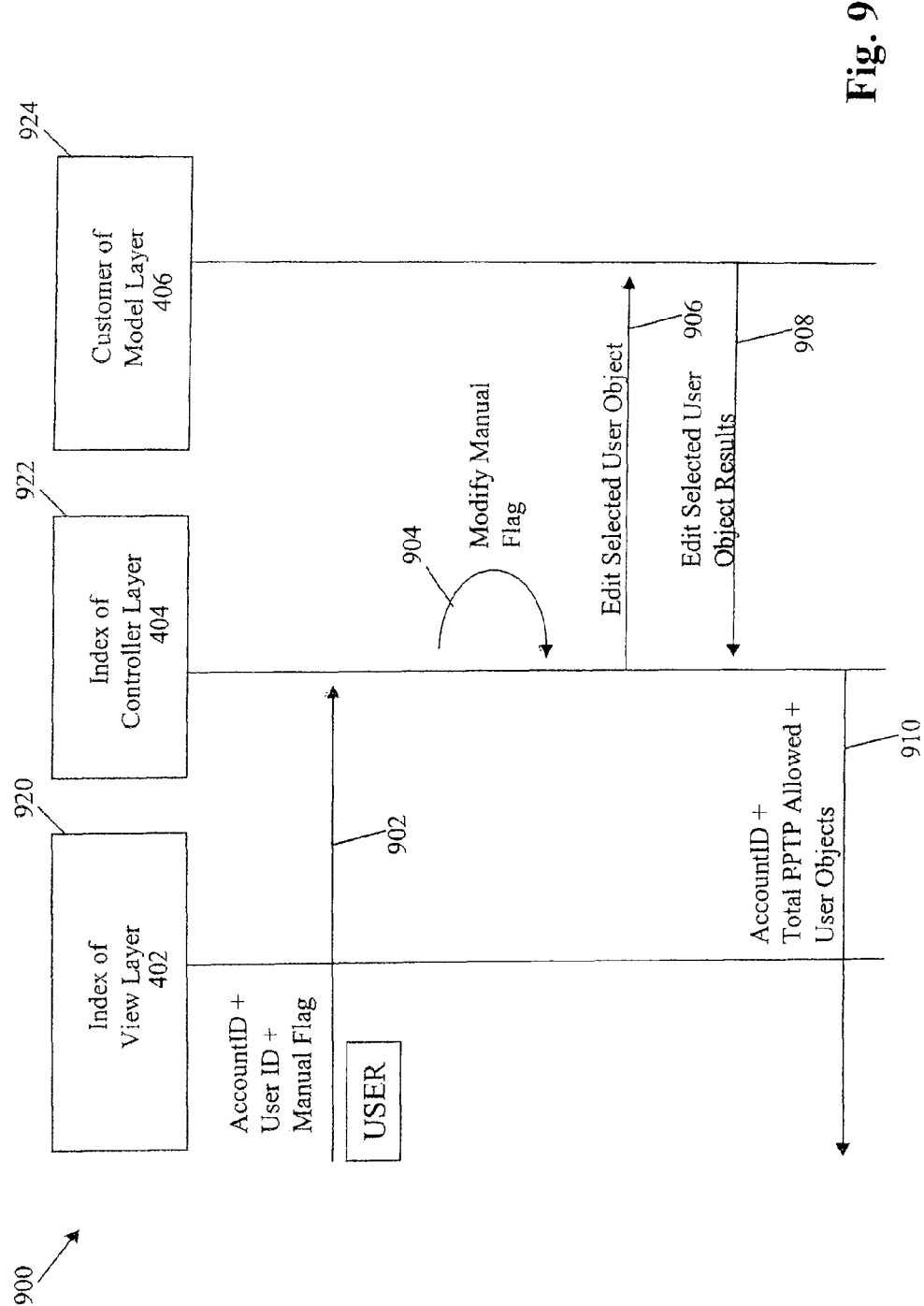
FIG. 9 is a sequence diagram showing an exemplary process for toggling a manual override of subnets for a user according to an embodiment of the present disclosure.

FIG. 9 is a sequence diagram 900 showing an exemplary process for toggling a manual override of subnets for a user according to an embodiment of the present disclosure. As discussed with reference to FIGS. 6A and 6B, the external/internal administrator can toggle the subnets setting in the VPN management pages 600, 650 to auto or manual. The process shown in the sequence diagram 900 utilizes an Account ID parameter, User ID parameter, and Override Flag parameter. The sequence diagram 900 begins with step 902 in which the user selects the subnets auto or manual box in the VPN management pages 600, 650 (FIG. 6A or 6B). Accordingly, the Account ID, User ID, and Manual Override Flag are sent to the index 922 of the controller layer 404. In step 904, the Manual Override Flag is modified in the controller layer 404. In step 906, a request is sent to edit the selected user object in the customer class 924 of the model layer 406. The sequence diagram 900 continues with step 908 in which results of the edited selected user object is sent to the controller layer 404. In step 910, the Account ID, a total PPTP allowed, and user objects are provided to the index template 920 of the view layer 402 to populate an updated VPN management form to display the manual overrides edit link if the subnets setting was toggled to manual (see FIG. 10) or display N/A if the subnets setting was toggled to auto.

Figure 10:
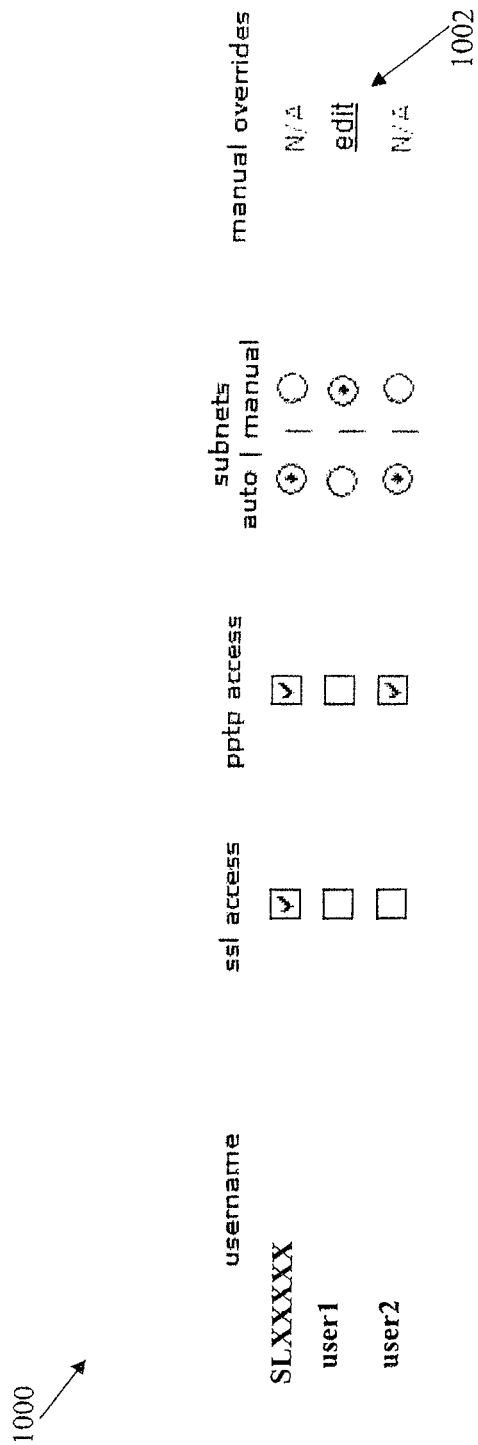
FIG. 10 is an exemplary screen layout of an updated VPN management page according to an embodiment of the present disclosure.

FIG. 10 is an exemplary screen layout of an updated VPN management page 1000 that includes a "manual overrides" edit link 1002. It is understood that the updated VPN management page 1000 may be an update to the external VPN management page 600 (FIG. 6A) for viewing by the external administrator or may be an update to the internal VPN management page 650 (FIG. 6B) for viewing by the internal administrator. As discussed above with reference to FIGS. 6A, 6B, and 9, when the external/internal administrator changes the subnets setting from auto to manual, the external/internal VPN management pages 600, 650 are updated so that the "manual overrides" edit link 1002 is displayed in the updated VPN management page 1000. In this example, the subnets setting has been changed from auto to manual for user1. The external/internal administrator may click on the "manual overrides" edit link 1002 which will result in the display of an underlying network layout page (see FIG. 13) as will be discussed below.

Figure 11:
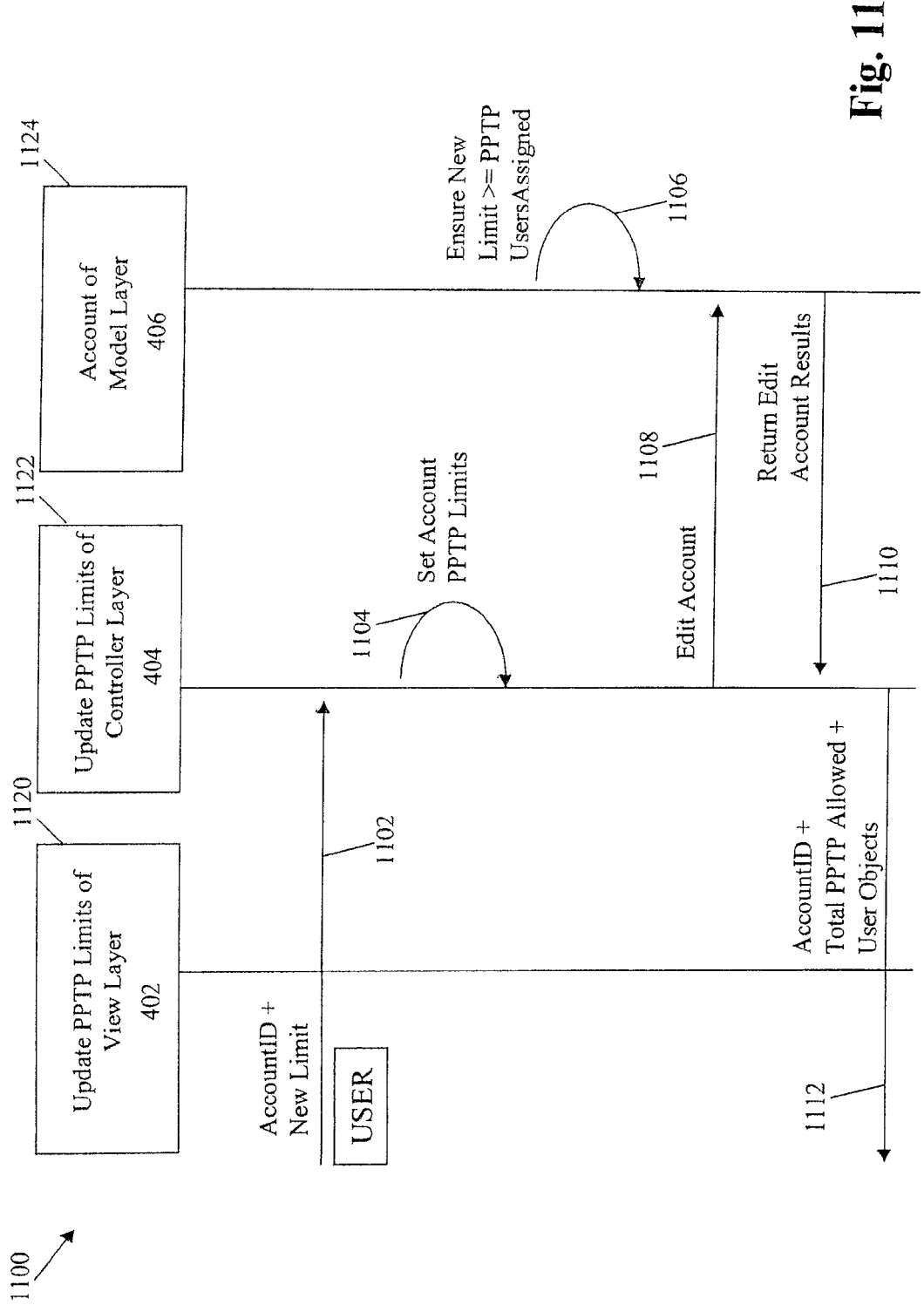
FIG. 11 is a sequence diagram of an exemplary process for updating PPTP limit for an account according to an embodiment of the present disclosure.

FIG. 11 is a sequence diagram 1100 showing an exemplary process for updating PPTP Limit for an account according to an embodiment of the present disclosure. The process shown in the sequence diagram 1100 utilizes an Account ID parameter and New PPTP Limit parameter. It is noted that the process shown in the sequence diagram 1100 is only available to the internal administrator for updating the PPTP limit for an account. The sequence diagram 1100 begins with step 1102 in which the internal administrator enters a new limit of PPTP access for an account in an update PPTP limits template 1120 of the view layer 402. Accordingly, the Account ID and New PPTP Limit are sent to an update PPTP limits method 1122 in the controller layer 404. In step 1104, the account PPTP limits is set to the new limit in the controller layer 404. In step 1106, a determination is made to ensure that the new limit is greater than or equal to the number of PPTP users assigned to that account in the account class 1124 of the model layer 406. For example, the new limit may be smaller than the previous limit. If the number of PPTP users assigned to that account was equal to the previous limit, the number of PPTP users assigned would now exceed the new limit. In this situation, an error message may be sent. If the new limit is proper, the sequence diagram 1100 continues with step 1108 in which a request is sent to edit the PPTP limit of the account class 1124 of the model layer 406. In step 1110, the Account ID, a total PPTP allowed, and user objects are provided to the view layer 402 to update the internal VPN management page to display the new PPTP limit for that account.

Figure 12:
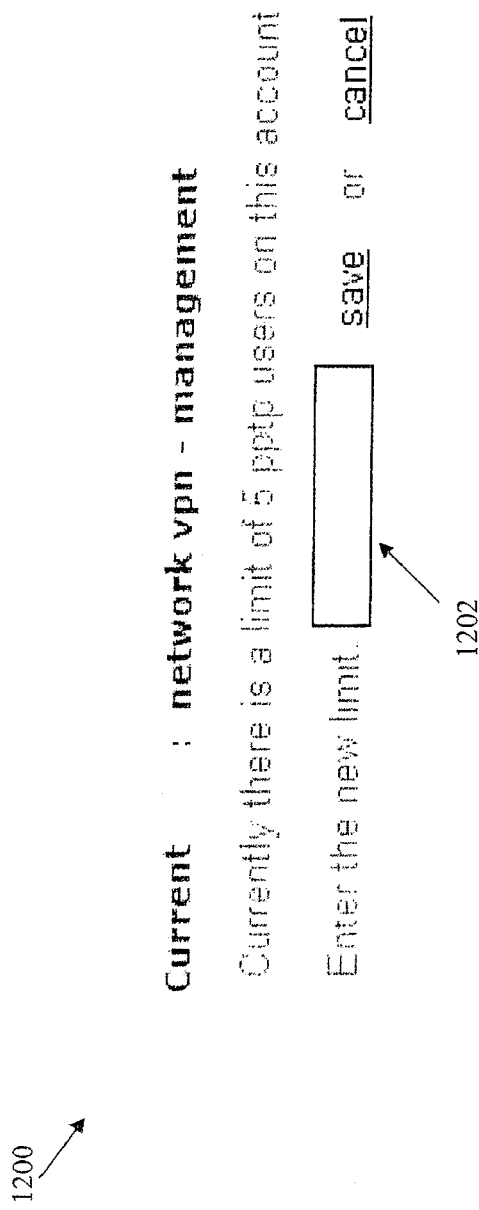
FIG. 12 is an exemplary screen layout of a PPTP limits page for an account according to the sequence diagram of FIG. 11.

FIG. 12 is an exemplary screen layout for a PPTP limits page 1200 according to the sequence diagram 1100 of FIG. 11. As noted above with reference to FIG. 6B, the internal administrator may click on the total allowed PPTP VPN users link 656 from the internal VPN management page 650. As a result, the internal administrator is shown the PPTP limits page 1200. The PPTP limits page 1200 indicates the current limit of PPTP users on the account. Further, the PPTP limits page 1200 includes a field 1202 for inputting a new limit of PPTP users on the account. Accordingly, the internal administrator can perform various actions from the PPTP limits page 1200. For example, the internal administrator may increase/decrease the limit of PPTP users by inputting a new limit in the field 1202 and clicking "save" which will increase/decrease the PPTP limits on the account and return the internal administrator to the internal VPN management page 650 (FIG. 6B). The internal administrator may click "cancel" which will return the internal administrator to the internal VPN management page 650 (FIG. 6B).

Figure 13:
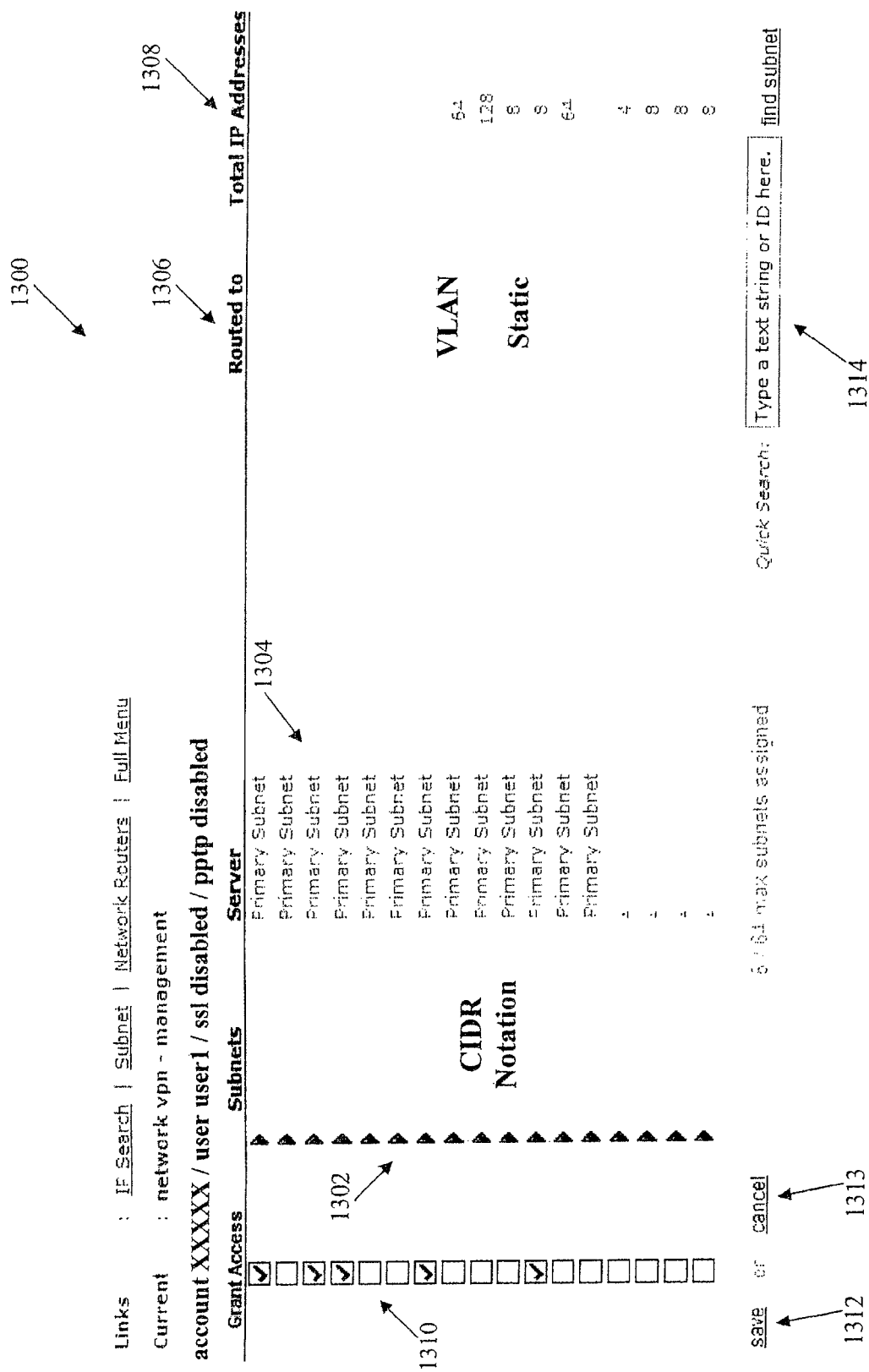
FIG. 13 is an exemplary screen layout of an underlying network layout page that allows for manual overrides according to an embodiment of the present disclosure.

FIG. 13 is an exemplary screen layout of an underlying network layout page 1300 that allows for manual overrides for a user. As discussed above with reference to FIG. 10, when the external/internal administrator clicks on the "manual overrides" edit link 1002 (FIG. 10) for a user (e.g., user1), the network layout page 1300 is displayed which enables the administrator to manually override subnets for a user. The network layout page 1300 includes all of the detailed network information that was selected for the administrator but was shielded from the administrator in the automatic subnet selection mode. The network layout page 1300 specifies the account number (e.g., account XXXXX), the username (e.g., user1), and whether user1 has SSL or PPTP access (e.g., ssl disabled/pptp disabled). The network layout page 1300 includes a list of subnets (e.g., Subnets) that are valid for account XXXXX. That is, the list of subnets displayed include all of the subnets on the account, not just those the user has access to. This allows the administrator to grant access to a subnet even though the user does not own hardware on that subnet. It is noted that a maximum number of subnets for any user is 64 based on limitations in the authentication database 306 shown in FIG. 3. However, the maximum number of subnets can be increased in other embodiments.

Network information regarding each subnet is provided and may include a private IP address (in CDIR notation) 1302, Server 1304, Route to 1306, and total IP addresses 1308. The external/internal administrator can view a subset of details about a subnet including the IP addresses associated with that subnet along with hardware names (e.g., server, router, etc.) when applicable. For example, a subnet with an IP address 1302 referenced as 10.3.0.0/24 includes a network IP address of 10.3.0.0, a broadcast IP address of 10.3.0.255, and usable IP addresses from 10.3.0.1 to 10.3.0.254 (total of 256 IP addresses). This includes the IP address of a server that serves the subnet indicated as a primary subnet. The Route to 1306 column includes a link to a virtual local area network (e.g., VLAN) associated with the subnet or may be noted as static. The total IP address 1308 indicates the total number IP addresses hosted on the subnet.

Additionally, the network layout page 1300 includes a grant access box 1310 for each subnet that can be selected (i.e. checked) or unselected (i.e. unchecked). This allows the external/internal administrator to manually override VPN access by subnet. That is, the external/internal administrator manages the user's VPN access by granting or not granting access to one or more subnets in a list of valid subnets for the account. The subnets that the user has been granted access may be included in a user's selected list (also referred to as the user's "white" list). The subnets that the user has not been granted access but are available to the account may be considered the user's "black" list, effectively restricting access from various parts of the network. It is noted that in the default setting (where the subnets setting is auto), access to all subnets where on which hardware is attached that the user has access to will be included in the user's selected list. The network layout page 1300 further includes a "save" link 1312 for saving the changes to the list of subnets, and a "cancel" link 1313 for canceling the changes to the list of subnets. Also, the network layout page 1300 includes a quick search box 1314 for allowing the external/internal administrator to find a subnet as will be discussed below.

The external/internal administrator can perform various actions from the network layout page 1300. For example, the external/internal administrator may click "add" (i.e. grant access box checked) which will remove the subnet from the available list, add the subnet to the selected list, and update a max/used subnet counter. The external/internal administrator may click "drop" (i.e. grant access box unchecked) which will remove the subnet in the selected list, add the subnet to available list, and update the max/used subnet counter. The external/internal administrator may enter an IP address or host name in the quick search box 1314, select correct search type, and click the "find subnet" link. As a result, a subnet detail view will be populated with results if the selection is found. The external/internal administrator may click "view" of a subnet in the list which will populate a subnet detail view with results. The subnet detail view may include the IP addresses associated with that subnet along with hardware names when applicable. The external/internal administrator may click the "save" link 1312 which will apply the changes for the user, and return to the VPN management page 1000 (FIG. 10). The external/internal administrator may click the "cancel" link 1313 which will ignore the changes, and return to the external/internal VPN management page 1000 (FIG. 10). The selected list of subnets for a user will be utilized during the VPN authentication process when the user logs into the customer portal for VPN access to the private network. That is, the user has VPN access to the subnets on the selected list.

Figure 14:
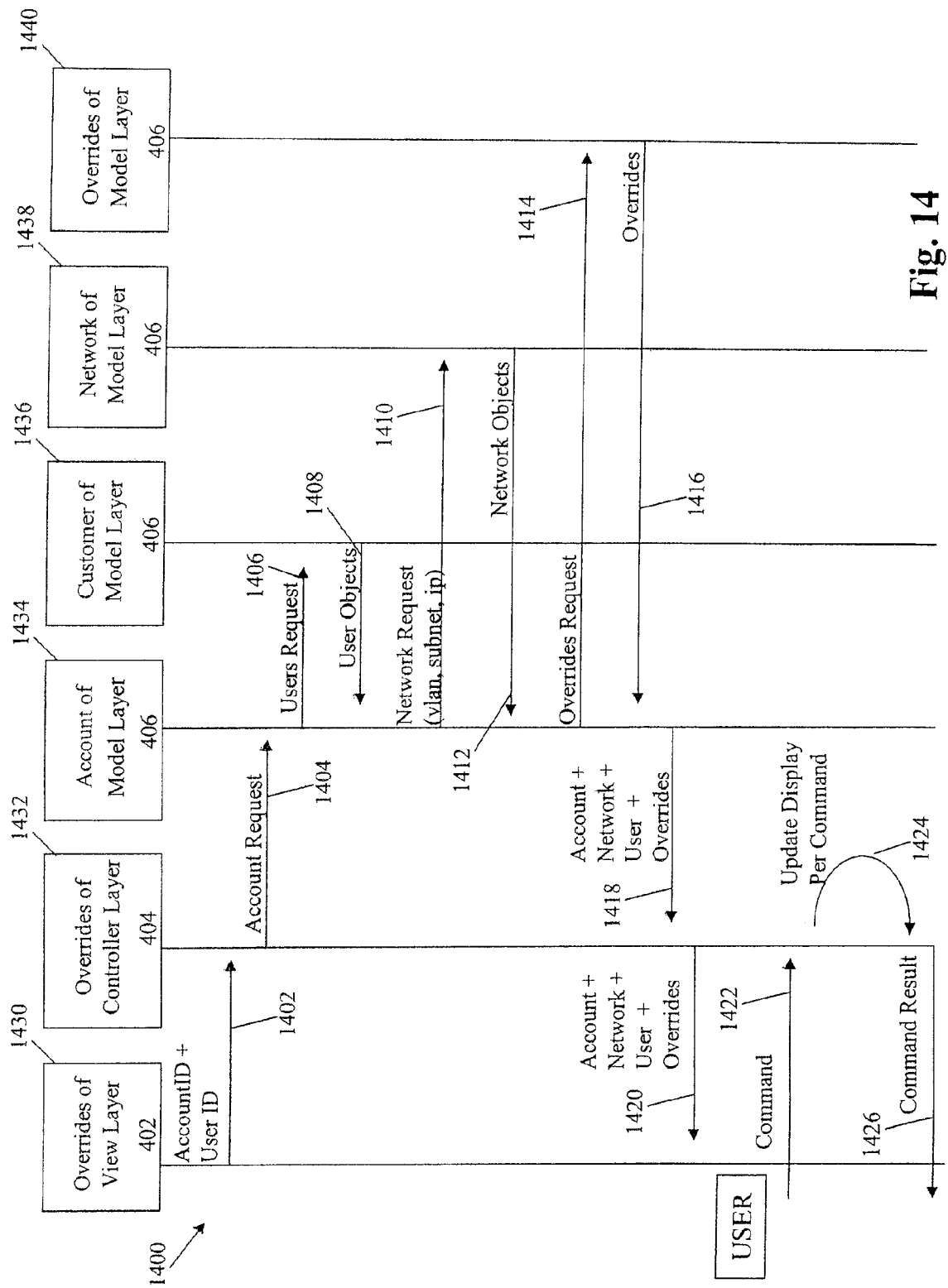
FIG. 14 is a sequence diagram of an exemplary process for editing manual overrides according to an embodiment of the present disclosure.

FIG. 14 is a sequence diagram 1400 showing an exemplary process for editing manual overrides according to an embodiment of the present disclosure. As discussed above with reference to FIGS. 6A and 6B, the external/internal administrator may desire to manually override subnet access for a user. Accordingly, the external/internal administrator may click the "edit manual overrides" link 1002 (FIG. 10), and, as a result, taken to the network layout page 1300 (FIG. 13) for that user. The external/internal administrator may select or unselect the grant access box 1310 in the manual overrides page 1300 to edit subnet access in accordance with the process shown in the sequence diagram 1400. A Command parameter is the input to the process shown in FIG. 14. The sequence diagram 1400 begins with step 1402 in which the Account ID and User ID are sent to an overrides portion 1432 of the controller layer 404. In step 1404, a request for account information is sent to the account class 1434 of the model layer 406. The sequence diagram 1400 continues with step 1406 in which a request for user information is sent to the customer class 1436 of the model layer 406. In step 1408, the user objects are provided to the account class 1434 of the model layer 406. In step 1410, a request for network information is sent to a network class 1438 of the model layer 406. The network information includes virtual local area network (vlan), subnet, and IP information for that user. In step 1412, network objects are provided to the account class 1434 of the model layer 406. In step 1414, a request for overrides is sent to an overrides class 1440 of the model layer 404.

The sequence diagram 1400 continues with step 1416 in which overrides objects are provided to the account class 1434 of the model layer 406. In step 1418, the account, network, user, and overrides information are provided to the overrides portion 1432 of the controller layer 404. The sequence diagram 1400 continues with step 1420 in which account, network, user, and overrides information are provided to the overrides template 1430 of the view layer 402 for display (see manual overrides page 1300 of FIG. 13). In step 1422, the user selects to grant or deny access to a subnet from a list of valid subnets, and thus a command is sent to the overrides portion 1432 of the controller layer 404 accordingly. In step 1424, a display is updated per the command in the controller layer 404. In step 1426, results are sent to the overrides template 1430 of the view layer 402 for display (see manual overrides page 1300 of FIG. 13).

Figure 15:
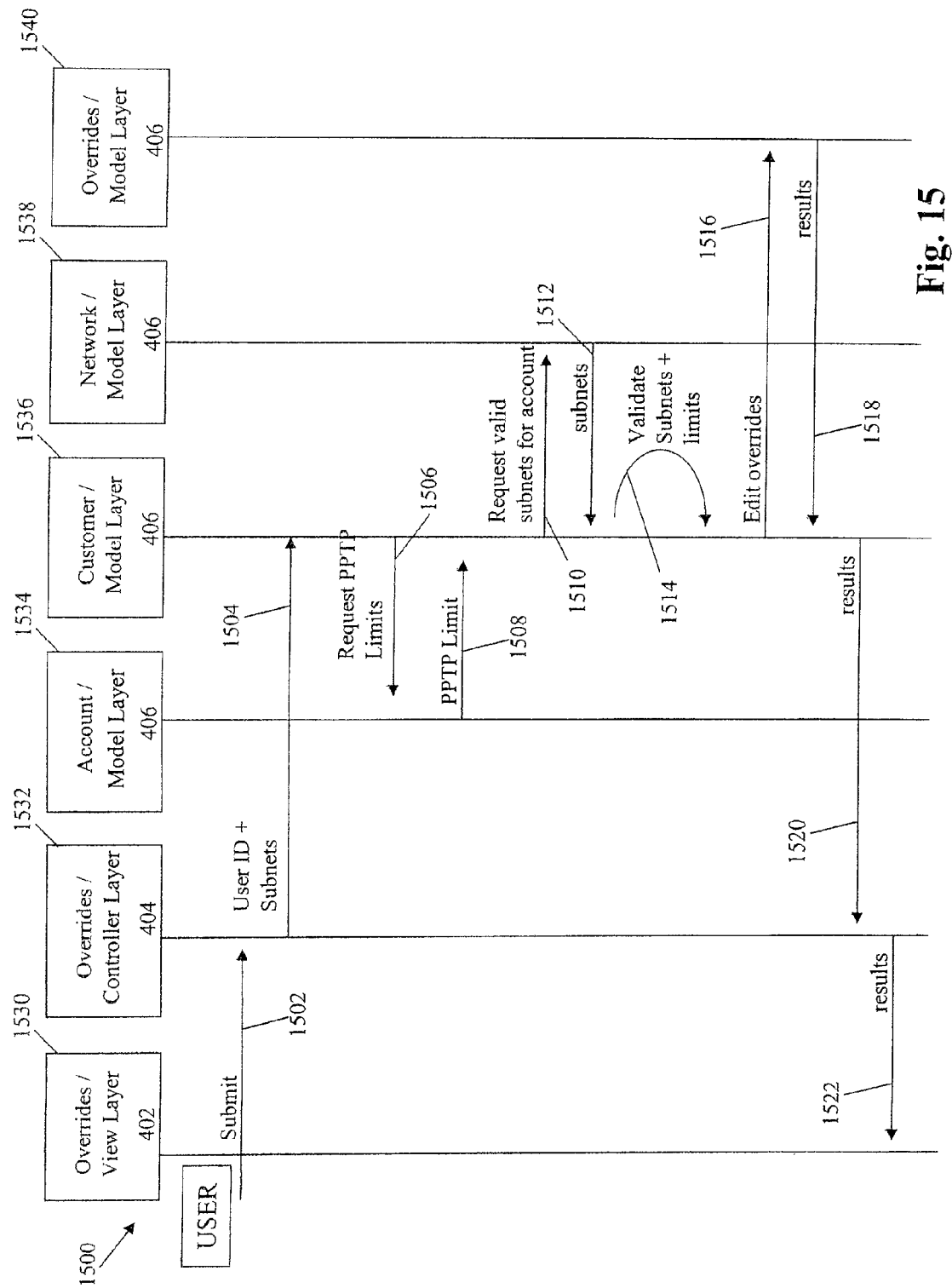
FIG. 15 is a sequence diagram of an exemplary process for saving manual overrides of subnet access according to an embodiment of the present disclosure.

FIG. 15 is a sequence diagram 1500 showing an exemplary process for saving manual overrides of subnets according to an embodiment of the present disclosure. As discussed above with reference to FIGS. 13 and 14, the external/internal administrator can manually override subnet access for a user from the manual overrides page 1300. Accordingly, the external/internal administrator may grant or deny access by clicking the grant access box 1310 for each subnet. The sequence diagram 1500 begins with step 1502 in which a user (external/internal administrator) clicks on the "save" link 1312 in the manual overrides page 1300 (FIG. 13). As a result, a save request is submitted to the overrides portion 1532 of the controller layer 404. In step 1504, the User ID and Subnets (that have been selected) are sent to the customer class 1536 of the model layer 406. In step 1506, the PPTP limit is requested in the account class 1534 of the of the model layer 406. In step 1508, the PPTP limit is provided to the customer class 1536 of the model layer 406. In step 1510, valid subnets for the account are requested in the network class 1538 of the model layer 406.

The sequence diagram 1500 continues with step 1512 in which the subnets for the account are provided to the customer class 1536 of the model layer 406. In step 1514, the subnets and the PPTP limit are validated in the customer class 1536 of the model layer 406. In step 1516, subnet overrides are edited in the overrides class 1540 of the model layer 406. The sequence diagram 1500 continues with step 1518 in which results are sent to the customer class 1536 of the model layer 406. The sequence diagram 1500 continues with step 1520 in which the results are sent to the overrides portion 1532 of the controller layer 404. In step 1522, the results are sent to the overrides template 1530 of the view layer 402 for display.

Figure 16:
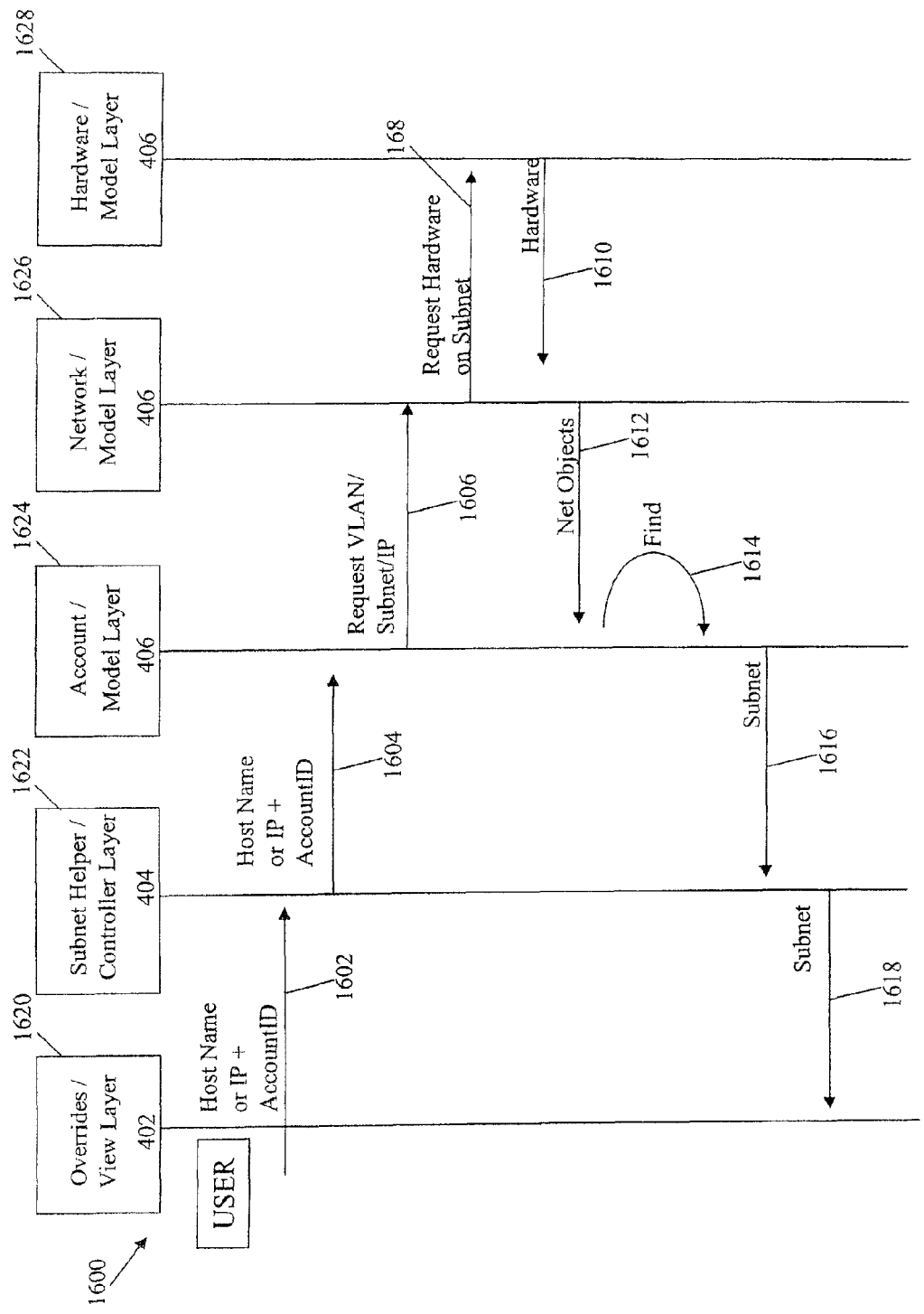
FIG. 16 is a sequence diagram of an exemplary process for a helper function that finds a subnet according to an embodiment of the present disclosure.

FIG. 16 is a sequence diagram 1600 showing an exemplary process of a helper function for finding a subnet according to an embodiment of the present disclosure. As discussed above with reference to FIG. 13, the external/internal administrator may desire to find a subnet of an account. Accordingly, the external/internal administrator can type in an IP address or host name in the quick search box 1314 of the manual overrides page 1300 (FIG. 13), and click the "find subnet" link. The process shown in the sequence diagram 1600 may utilize an IP address or Host name parameter, and Account ID parameter. The sequence diagram 1600 begins with step 1602 in which the Host name or IP address, and the Account ID are sent to a subnet helper 1622 of the controller layer 403. In step 1604, the Host name or IP address, and the Account ID are sent to the account class 1624 of the model layer 406. In step 1606, a request for network information such as VLAN, subnet, and IP address is sent to the network class 1626 of the model layer 406. In step 1608, a request for hardware information hosted on the subnets is sent to a hardware class 1628 of the model layer 406. In step 1610, hardware objects are provided to the network class 1626 of the model layer 406. The hardware objects include IP addresses and host names of hardware hosted on the subnets.

The sequence diagram 1600 continues with step 1612 in which network objects are provided to the account class 1624 of the model layer 406. In step 1614, a search is performed to find the subnet corresponding to the requested Host name or IP address. In step 1616, subnet information is sent to subnet helper 1622 of the controller layer 404 if found. The sequence diagram 1600 continues with step 1618 in which the subnet information is sent to the overrides template 1630 of the view layer 402 for display.

Figure 17:
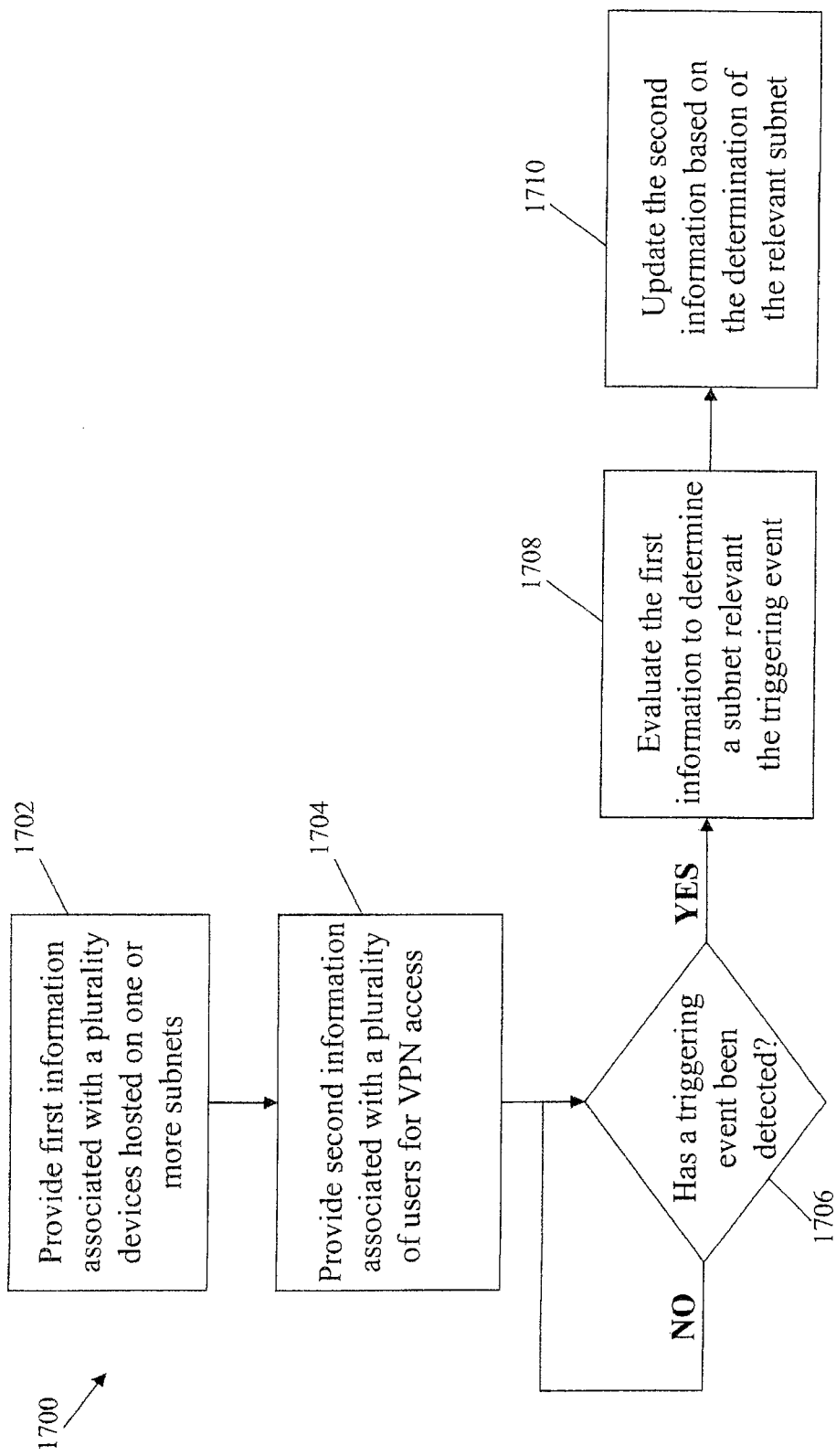
FIG. 17 is a flow chart of an exemplary method for real-time automated VPN access management according to various aspects of the present disclosure.

Referring to FIG. 17, illustrated is a flowchart of an exemplary method 1700 for managing VPN access to a private network partitioned into a plurality of subnets according to an embodiment of the present disclosure. The method 1700 may be implemented with the VPN management module 300 of FIG. 3 to provide real-time automated VPN access management. The method 1700 begins with block 1702 in which first information is provided. The first information is associated with a plurality of devices hosted on one or more subnets. For example, the first information may be provided in a hardware inventory database similar to the one 304 disclosed in FIG. 3. The first information includes location of the hardware on the network such as an IP address or other identification of the hardware such as a host name. The first information is updated in real-time as there are triggers in place that manage the addition and removal of hardware on the network. The method 1704 continues with block 1704 in which second information is provided. The second information is associated with a plurality of users for VPN access via the one or more subnets. For example, the second information may be provided in a database for storing VPN authentication records similar to the one 306 disclosed in FIG. 3. The VPN authentication record of a user includes the subnets to which the user has VPN access (e.g., the user's "white" list). The subnets to which the user has VPN access are dynamically determined based on the hardware each user has permission to access. That is, the system creates the list of subnets dynamically—the database need only contain the hardware or machines a user has access to, except in the case where the administrator desires to override the dynamic configuration and manually specify the subnets.

The method 1700 continues with decision block 1706 in which it is determined whether a triggering event has been detected. The triggering event may be from a hardware perspective, user perspective, or intermediate perspective. For example, a hardware triggering event may include adding new hardware on the network, removing existing hardware from the network, or moving existing hardware to a different subnet. A user triggering event may include adding of a new user (and the hardware on the network the user has rights to), removing an existing user, and modifying permission of an existing user to access hardware on the network. An intermediate triggering event may include changing a router within the network. A message can be broadcasted from a lowest level of the hardware in response to the triggering event. If no triggering event, the method 1700 continues to wait for a triggering event.

If a triggering event has been detected, the method 1700 proceeds to block 1708 in which responsive to the detection of the triggering event, the first information is evaluated to determine a subnet relevant to the triggering event. The evaluation includes searching the address information of the hardware on the network to find the subnet(s) on which the hardware is hosted. That is, it is determined which route gets to the hardware on the network. The method continues 1700 with step 1710 in which the second information is updated based on the determination of the relevant subnet. For example, the list of subnets that the user can access may be modified or relevant permissions can be readjusted in the user's VPN authentication record.

Aspects of the present disclosure may be implemented in software, hardware, firmware, or a combination thereof. The various elements of the system, either individually or in combination, may be implemented in a computer program product tangibly embodied in a machine-readable storage device for execution by a processing unit such as a processor, microcomputer, or digital machine. Various steps of embodiments disclosed herein may be performed by a computer processor executing a program tangibly embodied on a computer-readable storage device to perform functions by operating on input and generating output. The computer-readable storage device may be, for example, a memory, a transportable memory such as a compact disk, optical disk, or diskette, such that a computer program embodying the aspects of the present invention can be loaded onto a computer system. The computer program is not limited to any particular embodiment, and may, for example, be implemented in an operating system, application program, foreground or background process, driver, network stack, or any combination thereof, executing on a single computer processor or multiple computer processors. Additionally, various steps of embodiments of the present disclosure may provide one or more data structures generated, produced, received, or otherwise implemented on a computer-readable storage device such as a memory. The term "computer-readable storage device" does not mean a signal propagation media such as a copper transmission cable, an optical transmission fiber or a wireless transmission media.

The present disclosure has been described relative to a preferred embodiment. Improvements or modifications that become apparent to persons of ordinary skill in the art only after reading this disclosure are deemed within the spirit and scope of the application. It is understood that several modifications, changes and substitutions are intended in the foregoing disclosure and in some instances some features of the invention will be employed without a corresponding use of other features. For example, although the embodiments disclosed herein provide the ability to allow or deny VPN access by subnet, it is noted that further development is contemplated to allow delegation of VPN access all the way down to an individual IP address, or group of IP addresses via a subnet mask determined dynamically by the underlying algorithm of the invention. Further, the VPN management module may be implemented as a stand-alone product assuming there exist a system that links end-users to specific network-enabled devices. For example, the VPN management module may be tied a mechanism that keeps track of employees of the enterprise such as a badge entry system instead of the centralized VPN authentication database. Moreover, although the embodiments disclosed herein are directed to VPN management, it is contemplated that there are other network related entities that may benefit from being managed based on hardware triggers. Accordingly, it is appropriate that the appended claims be construed broadly and in a manner consistent with the scope of the invention.

What is claimed:

1. A method of managing virtual private network (VPN) access to a plurality of subnets containing respective hardware devices, the method comprising the steps of:
   receiving, by a processor, registration of a first user as authorized to access a first hardware device, the first hardware device currently residing on a first subnet and not a second subnet, and in response, granting the first user VPN access to the first subnet but not the second subnet;
   receiving, by the processor, registration of a second user as authorized to access a second hardware device, the second hardware device currently residing on the second subnet and not the first subnet, and in response, granting the second user VPN access to the second subnet but not the first subnet; and subsequently,
   detecting, by the processor, that the first hardware device resides on the second subnet and not the first subnet, and in response, the processor automatically granting the first user VPN access to the second subnet,
   wherein the first user is registered as authorized to access the first hardware device based on a first IP address or a first host name of the first hardware device, and
   wherein the second user is registered as authorized to access the second hardware device based on a second IP address or a second host name of the second hardware device.

2. The method of claim 1 wherein in response to (a) the processor subsequently detecting that the first hardware device resides on the second subnet and does not reside on the first subnet and (b) the processor determining that the first user is not currently registered to access any hardware devices on the first subnet, the processor automatically revoking VPN access by the user to the first subnet.

3. The method of claim 1 wherein:
   in response to the receipt of the registration of the first user as authorized to access the first hardware device, the processor automatically determines that the first hardware device currently resides on the first subnet and not the second subnet, and the processor automatically grants the first user VPN access to the first subnet but not the second subnet; and
   in response to the receipt of the registration of the second user as authorized to access the second hardware device, the processor automatically determines that the second hardware device currently resides on the second subnet and not the first subnet, and the processor automatically grants the second user VPN access to the second subnet but not the first subnet.

4. The method of claim 1, said method further comprising:
   partitioning a private network into the plurality of subnets, wherein the plurality of subnets includes the first subnet and the second subnet.

5. A computer program product for managing virtual private network (VPN) access to a plurality of subnets containing respective hardware devices, the computer program product comprising:
   one or more computer-readable storage devices, and program instructions stored on the one or more storage devices, the program instructions comprising:
   program instructions to receive registration of a first user as authorized to access a first hardware device, the first hardware device currently residing on a first subnet and not a second subnet, and in response, grant the first user VPN access to the first subnet but not the second subnet;
   program instructions to receive registration of a second user as authorized to access a second hardware device, the second hardware device currently residing on the second subnet and not the first subnet, and in response, grant the second user VPN access to the second subnet but not the first subnet; and
   program instructions to detect that the first hardware device subsequently resides on the second subnet and not the first subnet, and in response, automatically grant the first user VPN access to the second subnet,
   wherein the first user is registered as authorized to access the first hardware device based on a first IP address or a first host name of the first hardware device, and
   wherein the second user is registered as authorized to access the second hardware device based on a second IP address or a second host name of the second hardware device.

6. The computer program product of claim 5 further comprising:
   program instructions, stored on the one or more storage devices, responsive to the subsequent detection that the first hardware device resides on the second subnet and does not reside on the first subnet, to determine that the first user is not currently registered to access any hardware devices on the first subnet, and in response, automatically revoke VPN access by the user to the first subnet.

7. The computer program product of claim 5 further comprising:
   program instructions, stored on the one or more storage devices, responsive to the receipt of the registration of the first user as authorized to access the first hardware device, to automatically determine that the first hardware device currently resides on the first subnet and not the second subnet, and in response, automatically grant the first user VPN access to the first subnet but not the second subnet; and
   program instructions, stored on the one or more storage devices, responsive to the receipt of the registration of the second user as authorized to access the second hardware device, to automatically determine that the second hardware device currently resides on the second subnet and not the first subnet, and automatically grant the second user VPN access to the second subnet but not the first subnet.

8. The computer program product of claim 5, further comprising:
   program instructions, stored on the one or more storage devices, to partition a private network into the plurality of subnets, wherein the plurality of subnets includes the first subnet and the second subnet.

9. A computer system product for managing virtual private network (VPN) access to a plurality of subnets containing respective hardware devices, the computer system comprising:
   one or more processors, one or more computer-readable memories and one or more computer-readable storage devices, and program instructions stored on the one or more storage devices for execution by the one or more processors via the one or more memories, the program instructions comprising:

program instructions to receive registration of a first user as authorized to access a first hardware device, the first hardware device currently residing on a first subnet of a private network and not a second subnet of the private network, and in response, grant the first user VPN access to the first subnet but not the second subnet;

program instructions to receive registration of a second user as authorized to access a second hardware device, the second hardware device currently residing on the second subnet and not the first subnet, and in response, grant the second user VPN access to the second subnet but not the first subnet; and program instructions to detect that the first hardware device subsequently resides on the second subnet and not the first subnet, and in response, automatically grant the first user VPN access to the second subnet, wherein the first user is registered as authorized to access the first hardware device based on a first IP address or a first host name of the first hardware device, and wherein the second user is registered as authorized to access the second hardware device based on a second IP address or a second host name of the second hardware device.

10. The computer system of claim 9 further comprising:

program instructions, stored on the one or more storage devices for execution by the one or more processors via the one or more memories, responsive to the subsequent detection that the first hardware device resides on the second subnet and does not reside on the first subnet, to determine that the first user is not currently registered to access any hardware devices on the first subnet, and in response, automatically revoke VPN access by the user to the first subnet.

11. The computer system of claim 9 further comprising:

program instructions, stored on the one or more storage devices for execution by the one or more processors via the one or more memories, responsive to the receipt of the registration of the first user as authorized to access the first hardware device, to automatically determine that the first hardware device currently resides on the first subnet and not the second subnet, and in response, automatically grant the first user VPN access to the first subnet but not the second subnet; and program instructions, stored on the one or more storage devices for execution by the one or more processors via the one or more memories, responsive to the receipt of the registration of the second user as authorized to access the second hardware device, to automatically determine that the second hardware device currently resides on the second subnet and not the first subnet, and automatically grant the second user VPN access to the second subnet but not the first subnet.

12. The computer system of claim 9, further comprising:

program instructions, stored on the one or more storage devices for execution by the one or more processors via the one or more memories, to partition a private network into the plurality of subnets, wherein the plurality of subnets includes the first subnet and the second subnet.

\* \* \* \* \*